US009430733B2

(12) United States Patent
Blondiaux et al.

(10) Patent No.: US 9,430,733 B2
(45) Date of Patent: Aug. 30, 2016

(54) UNIQUE SECURITY DEVICE FOR THE IDENTIFICATION OR AUTHENTICATION OF VALUABLE GOODS, FABRICATION PROCESS AND METHOD FOR SECURING VALUABLE GOODS USING SUCH A UNIQUE SECURITY DEVICE

(75) Inventors: Nicolas Blondiaux, Neuchatel (CH); David Hasler, Neuchatel (CH); Raphael Pugin, Auvernier (CH); Edoardo Franzi, Yverdon-les-Bains (CH)

(73) Assignee: CSEM CENTRE SUISSE D'ELECTRONIQUE ET DE MICROTECHNIQUE SA—RECHERCHE ET DEVELOPPEMENT, Neuchatel (CH)

( * ) Notice: Subject to any disclaimer, the term of this patent is extended or adjusted under 35 U.S.C. 154(b) by 1259 days.

(21) Appl. No.: 12/599,412

(22) PCT Filed: May 7, 2008

(86) PCT No.: PCT/EP2008/055606
§ 371 (c)(1),
(2), (4) Date: Jan. 29, 2010

(87) PCT Pub. No.: WO2008/135586
PCT Pub. Date: Nov. 13, 2008

(65) Prior Publication Data
US 2010/0195916 A1    Aug. 5, 2010

(30) Foreign Application Priority Data
May 7, 2007    (EP) .................... 07107615

(51) Int. Cl.
G06K 19/00    (2006.01)
G06K 19/08    (2006.01)
(Continued)

(52) U.S. Cl.
CPC ............. *G06K 19/086* (2013.01); *B42D 25/00* (2014.10); *B42D 25/29* (2014.10)

(58) Field of Classification Search
USPC ................................ 235/487, 491
See application file for complete search history.

(56) References Cited

U.S. PATENT DOCUMENTS 5,719,939 A    2/1998  Tel
6,309,690 B1    10/2001  Brogger et al.
(Continued)

FOREIGN PATENT DOCUMENTS

DE    102 04 870    8/2003
GB    2 221 870    2/1990
(Continued)

OTHER PUBLICATIONS

4 Estimation—2D Projective Transformations, pp. 122-125.
(Continued)

*Primary Examiner* — Rafferty Kelly
(74) *Attorney, Agent, or Firm* — Young & Thompson

(57) ABSTRACT

A security device for the identification or authentication of valuable goods is described, including a thin material layer (22, 26) presenting a stochastic pattern including micro/submicrostructures, where the latter are arranged in blobs (2) each of which presents a complexity factor $$Cx = \frac{L^2}{4\pi \cdot A},$$

where L is the perimeter of the blob and A its area, and wherein blobs having a $C_x$ value greater than or equal to 2 cover at least 5%, preferably at least 15%, of the device surface. According to a preferred embodiment, the material layer may include a film including at least a first and a second polymers arranged respectively within a first and a second phases defining the micro/submicrostructures. Preferred processes of fabrication are also disclosed, as well as a method for securing a valuable good based on such a security device.

16 Claims, 13 Drawing Sheets

(51) Int. Cl.
  *B42D 25/29* (2014.01)
  *B42D 25/00* (2014.01)

(56) References Cited

U.S. PATENT DOCUMENTS

| 2005/0239207 | A1  | 10/2005 | Gelbart |         |
|--------------|-----|---------|---------|---------|
| 2007/0023494 | A1* | 2/2007  | Haraszti et al. | 235/12 |
| 2008/0110995 | A1* | 5/2008  | Iftime et al. | 235/491 |

FOREIGN PATENT DOCUMENTS

| GB | 2 324 065    | 10/1998 |
|----|--------------|---------|
| WO | 2004/070667  | 8/2004  |
| WO | 2005/080088  | 9/2005  |
| WO | 2006/022808  | 3/2006  |
| WO | 2007/002873  | 1/2007  |

OTHER PUBLICATIONS 10.3.6. Adaptive Coding and Vector Quantization. pp. 638-641.

Sunil Arya et al., "An Optimal Algorithm for Approximate Nearest Neighbor Searching in Fixed Dimensions" pp. 1-33.

John Canny et al., "A Computational Approach to Edge Detection", IEEE Transactions on Pattern Analysis and Machine Intelligence, vol. PAMI-8, No. 6, Nov. 1986, pp. 679-698.

Pina Marziliano et al., "A No-Reference Perceptual Blur Metric", pp. 1-4.

"2.6 Singular Value Decomposition", pp. 59-71, sample page from Numerical Recipes in C: The art of Scientific Computing (ISBN 0-521-43108-5).

International Search Reporting dated Nov. 21, 2008, from corresponding PCT application.

\* cited by examiner

UNIQUE SECURITY DEVICE FOR THE IDENTIFICATION OR AUTHENTICATION OF VALUABLE GOODS, FABRICATION PROCESS AND METHOD FOR SECURING VALUABLE GOODS USING SUCH A UNIQUE SECURITY DEVICE

TECHNICAL FIELD

The present invention relates to a unique security device that may be applied on a valuable good to prevent counterfeiting of the latter or to allow its identification or authentication to follow the goods all along their fabrication and life times. Examples of valuable goods on which such a mark may be applied are works of art like paintings, consumer goods such as watches, or semiconductor devices, micro-electromechanical systems (MEMS), and more generally products fabricated using micro-technology processes. Furthermore, the invention also concerns a process for the fabrication of such a security device, as well as a method of identification or authentication of a valuable good based on the use of such a security device.

More particularly, it is intended to provide the security device with a thin material layer presenting a stochastic pattern comprising microstructures which, upon reading with a specific reader, may generate an image data which could be compared to a reference image previously stored in a security database in order to identify or verify authenticity of a corresponding valuable good. In the present description, the term microstructure(s) will be used not only for designating structures the size of which is of the order of the micron but also for designating more generally structures in the submicron ranges.

BACKGROUND ART

Security devices and corresponding methods of use of the above kind are already known in the prior art.

Patent application GB 2 324 065 A discloses a security device comprising, for example, an epoxy resin in which small beads are embedded with a random distribution. Such devices however have become easy to reproduce, given their features and dimensions.

As another example, patent publication WO 2005/104008 discloses a security device comprising a medium in which taggants are embedded according to a random pattern. In a preferred embodiment, where the medium and the taggants react differently to an exposure to electromagnetic radiations, a representation of the random pattern may be obtained by exposing the device to such radiations. The obtained representation may then be compared to a previously recorded reference representation in order to authenticate the object carrying the security device.

The only practical example which is mentioned in this document relates to the mixing of a small amount of taggant particles with a liquid such as an ink.

The security device is based mainly on the fact that the taggants are invisible to the human eye, a specific detector being necessary to create the representation to be compared to the reference.

However, such an approach has now become usual and reproduction of the pattern is possible once the taggants have been identified and the appropriate detector found.

As another example, U.S. Pat. No. 5,907,144 describes a method to fabricate a micro bar-code on the edge of a magnetic disk for identification of defective items. The advantage of bar codes over alphanumerical characters is that the area required to write the ID number is much smaller. When marks are made for traceability purposes, the marks produced have to be as large as possible to enable an easy identification during fabrication (using optical microscopy). Since devices becomes smaller and smaller, the limiting factor concerning the maximal size achievable is the area available to make the mark. The bar codes take less space and less time to write than alphanumerical characters for the same amount of information. The techniques used to produce such bar codes generally involve laser scribe systems which permit the fabrication of features with sizes of tens of micrometers to few hundred of micrometers depending on the process. This approach would however not be appropriate in the case of anti counterfeiting since it would be easy to identify and reproduce the naming scheme or micropattern which is used.

DISCLOSURE OF THE INVENTION

An object of the present invention is to alleviate the drawbacks of the prior art by proposing a security device which presents structural features making it non-reproducible and, at the same time, readable in efficient and reliable ways.

For this purpose, the invention relates to a security device of the above-mentioned type, its microstructures being arranged in blobs each of which presents a complexity factor $$Cx = \frac{L^2}{4\pi \cdot A},$$

where L is the perimeter of the blob and A its area. More particularly, according to the invention, blobs having a Cx value greater than or equal to 2 cover at least 5%, preferably at least 15%, of the device surface.

Said microstructures can have lateral sizes ranging from 20 nm to a few tens of micrometers, preferably from 100 nm to a few tens of micrometers.

In the present description, by blob it is generally meant a geometrical domain having a worm-like shape, regardless its length.

The lateral size of the considered blobs imaged using optical means should preferably be in the range of 1 μm to 20 μm. With current technologies, it is indeed difficult to characterize structures below 1 μm using a standard optical microscope. Structures larger than 20 μm are about to be reproduced using state of the art ink-jet printing systems. For fingerprints imaged using Scanning Electron or Atomic Force Microscope, the considered blob size may further be in the range of 20 nm to 1 μm.

Thanks to these features, it is possible to identify the security device not only on the basis of the blob locations but also on their shapes, which leads to a more precise comparison with the reference image with respect to prior art devices.

In some embodiments, the material layer may include a film comprising at least a first and a second polymers arranged respectively within a first and a second phases defining said microstructures.

In other embodiments, said material layer may be made of a compound chosen in the group comprising polymeric, metallic, metal-oxides and silicon-based compounds, said microstructures being defined by etched portions of said material layer having the shape of blob holes.

In other embodiments, the material layer may be integral with a part made of a compound chosen in the group comprising polymeric, metallic, metal-oxides and silicon-based compounds (as PET, quartz, silicon, glass or sapphire), the micro/submicrostructures being defined by etched portions of the material layer having the shape of blob holes, said part being able to be a part of the valuable good itself. In that case, the blob holes preferably have a depth substantially between tens of nanometers and a few tens of µm.

In some embodiments, the material layer may present a stochastic pattern comprising nanostructures.

The present invention further relates to several processes for the fabrication of a security device for the identification or authentication of valuable goods comprising the steps consisting in:
  providing a single phase solution containing at least a first and a second polymers within a predefined solvent,
  carrying out a demixing step of the solution on a predefined substrate, while evaporating the solvent in order to obtain a thin film including at least a first and a second phases defining a stochastic pattern comprising microstructures,
wherein the first and second polymers present such respective chemical formulas and such respective concentrations in the solution and, the demixing step being carried out at such predefined conditions, that the microstructures are arranged in blobs each of which presents a complexity factor $$Cx = \frac{L^2}{4\pi \cdot A},$$

where L is the perimeter of the blob and A its area, blobs having a Cx value greater than or equal to 2 covering at least 5% of the device surface.

Specific embodiments of the process will be described hereunder and appear from the appended claims.

In modes for carrying out the invention, four preferred embodiments are considered for the fabrication of the security device. In the first two embodiments, the fabrication of single scale random structures is described while the other two embodiments involve the fabrication of dual length-scale structures.

For each approach (single scale or multi scale), the two alternative embodiments consist in either the fabrication of the random structures in a thin polymer film deposited on a substrate or the fabrication of structures directly transferred in the surface of the valuable good to mark.

In the first preferred embodiment, the material layer presenting a stochastic pattern comprising microstructures is fabricated by polymer demixing and may include a film comprising at least a first and a second polymers arranged respectively within a first and a second phases defining the microstructures. Subsequent to the demixing step, the process may comprise the additional step consisting in:
  removing a first of said first and second phases to coarsen topography of the resulting demixed microstructures.

In the second preferred embodiment, material layer presenting a stochastic pattern comprising microstructures is used as etch mask or to fabricate an etch mask allowing the transfer of the stochastic microstructures into the underlying substrate, said substrate being able to be a part of the valuable good itself. Preferably, the process may comprise the additional steps consisting in:
  removing a first of said first and second phases and etching the remaining phase down to said substrate to expose parts of the latter, and to create a structured polymer mask,
  etching said substrate through said structured polymer mask,
  optionally removing said structured polymer mask.

For higher aspect-ratio microstructures, the process may also comprise the fabrication of an intermediate metal mask via the additional steps consisting in:
  removing a first of said first and second phases and etching the remaining phase down to said substrate to expose parts of the latter,
  depositing a metal layer to create a metal mask on said exposed parts of said substrate,
  removing the second of said first and second phases from said substrate,
  optionally, etching said substrate according to said metal mask to make blob holes having a depth substantially between tens of nanometers and a few of µm.

The third preferred embodiment is an extension of the first embodiment. Dual-length-scale structures are fabricated by the selective incorporation of optically detectable nano-objects (e.g. fluorescent nanoparticles) within one of the two phases present in the two polymer film. Said film may further contain a third polymer which is a block copolymer which one block is based on either said first or said second polymer, the second block comprising functional groups being able to interact with said nanoparticles so that they are mainly located within the phase corresponding to the polymer on which the block copolymer is based. For this, compared to the first embodiment, the process may comprise an additional step consisting in adding to the single phase solution a solution containing optically detectable nanoparticles. The process may comprise another additional step consisting in:
  adding to the single phase polymer blend solution, containing optically detectable nanoparticles, a third polymer such as a block copolymer which one block is based on either the first or the second polymer. The nature of the functional groups of the second block are advantageously chosen to be able to interact with the nanoparticles so that they are stabilized and mainly located within the phase corresponding to the polymer on which the block copolymer is based.

Finally the fourth preferred embodiment is an extension of the second embodiment. Nanostructures are introduced within stochastic microstructures to allow dual-length-scale patterns to be transferred into the underlying substrate, said substrate being able to be a part of the valuable good itself. The process may comprise additional steps consisting in:
  removing a first of said first and second phases and etching the remaining phase down to said substrate to expose parts of the latter,
  depositing a metal layer to create a metal mask on said exposed parts of said substrate,
  removing the second of said first and second phases from said substrate, as in the second embodiment, these three steps being able to be repeated one more time after the deposition of an additional polymer blend, leading to the formation of a micro- and nanostructured polymeric thin film,
  optionally, etching said substrate according to said metal mask to make blob holes having a depth substantially between tens of nanometers and a few tens of µm.

Thanks to these processes, a security device presenting the required features can be fabricated so that identification or authentication of a valuable good can be implemented in a reliable manner.

The present invention also relates to a method for securing a valuable good against counterfeiting, comprising the steps consisting in:
producing a security device according to the present invention,
creating a reference image data of the security device to be stored in a security database,
applying the security device on a surface of the valuable good,
creating a verification image data of at least part of the security device,
comparing the verification image data to reference image data stored in the security database,
identifying or authenticating the valuable good if the verification image data matches one of the reference image data stored in the security database.

The present invention also relates to another method for securing a valuable good against counterfeiting, comprising the steps consisting in:
producing a security device according to the present invention on a surface of the valuable good,
creating a reference image data of the security device to be stored in a security database,
creating a verification image data of at least part of the security device,
comparing the verification image data to reference image data stored in the security database,
identifying or authenticating the valuable good if the verification image data matches one of the reference image data stored in the security database.

These methods may be comprise the additional steps consisting in:
creating data from at least one additional reference image of the security device to be stored in a security database, each of said additional reference image being illuminated by a different illumination scheme,
creating data from at least one additional verification image of at least part of the security device, using respectively the same illumination schemes as for the additional reference images,
comparing the data of the additional verification images to the data from the additional reference images stored in the security database.

BRIEF DESCRIPTION OF THE DRAWINGS

Other features and advantages of the present invention will become more clearly apparent on reading the following detailed description of exemplary embodiments of the present invention, with reference to the appended drawings given by way of non-limiting examples, in which:

FIG. 2b shows, schematically, an alternate embodiment of the process illustrated on FIG. 2a;

MODES FOR CARRYING OUT THE INVENTION

The present invention aims at providing a security device to help preventing counterfeiting of valuable goods, and which can make a corresponding authenticity test of such an item available to a non-expert user.

For that purpose, it is proposed to incorporate in the valuable object a unique stochastic security device, or mark, comprising a physical microstructure and to devise a system to read, store and recognize that stochastic mark. The stochastic mark has to be made unique and non replicable, even by the process that created it in the first place. In some applications, it is important that the stochastic mark cannot be extracted from an object and placed on another one. The mark can be applied on a surface of the valuable good or can be integral with a surface of the valuable good.

After marking the object, one can read the mark with a dedicated reading device, and store the resulting digital reference description or representation in a reference security database. To check the authenticity of an item, or to identify the latter, the same type of reading device is used than that used to create the reference representation. This stochastic read mark is compared to the one stored in the reference database using a dedicated technique, which reveals if the item is authentic or not.

Figure 1A:
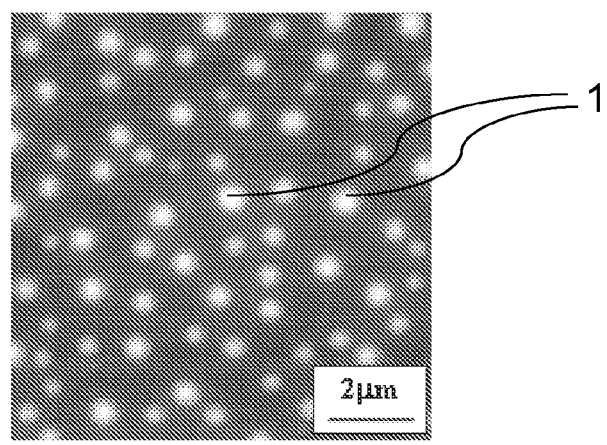
FIGS. 1a, 1b, 1c and 1d show schematic representations, respectively, of an example of a prior art security device image, of an example of a security device image according to the present invention, of the latter after a first filtering operation, and of the same after a second filtering operation.

FIG. 1a illustrates a random pattern that may be fabricated by a demixing process of a two polymer blend, mixed in meta-stable proportions. The two polymers are first mixed in an appropriate solvent and, when the latter is removed during a demixing process through which a film is formed, circular spots 1 appears at random locations in the film originating from a phase separation of the polymers. This phenomenon is called "nucleation and growth" and corresponds to the formation of droplets of one of the polymers embedded in a matrix of the second polymer.

The Applicant has experienced that the quality and reliability of the security device reading can be improved provided the random pattern of the device presents a sufficient complexity. Indeed, to allow a reliable reading the pattern should advantageously comprise micro/submicrostructures having the form of blobs 2, as visible on the image of FIG. 1b. More particularly, the complexity of a blob may be expressed by the following formula:

$$Cx = \frac{L^2}{4\pi \cdot A},$$

where L is the perimeter of a blob and A its area. The Applicant has arrived to the conclusion that a condition according to which blobs having a Cx value greater than or equal to 2 cover at least 5%, preferably at least 15%, of the device surface is necessary to get a good reliability in the image creation process.

Figure 1B:
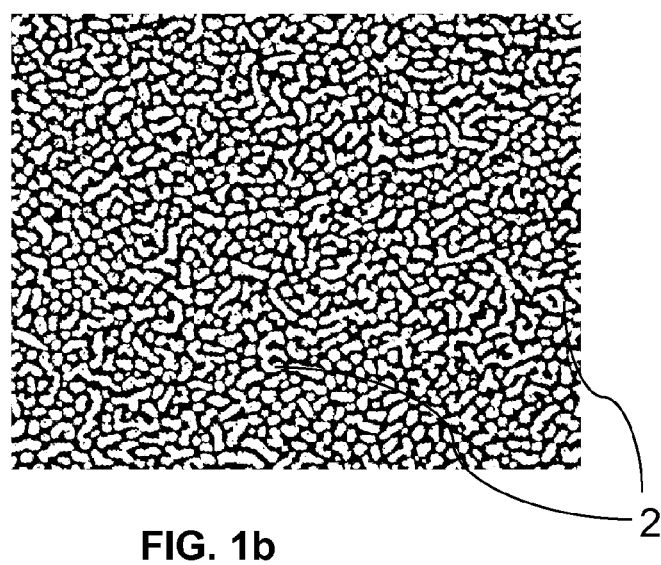

FIG. 1b represents the resulting image taken from a security device comprising a material layer in which, for example, two different phases are randomly distributed on the surface or two different mean height levels are provided, so that the image includes bright and dark zones, here represented in black and white in a non limiting manner.

It is noticeable that the image of FIG. 1b corresponds to a situation where blobs having a Cx value greater than or equal to 2 cover approximately 26% of the security device surface.

Figure 1C:
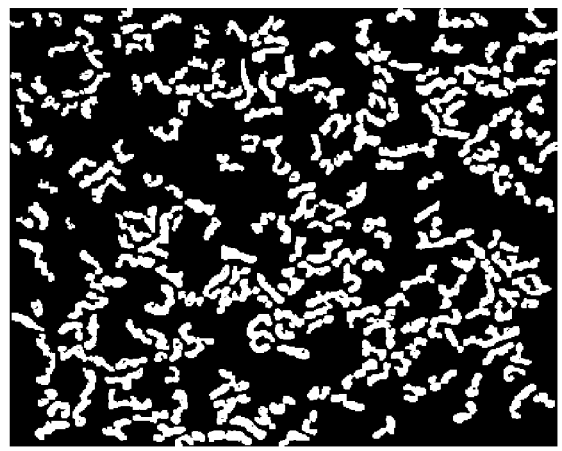
Figure 1D:
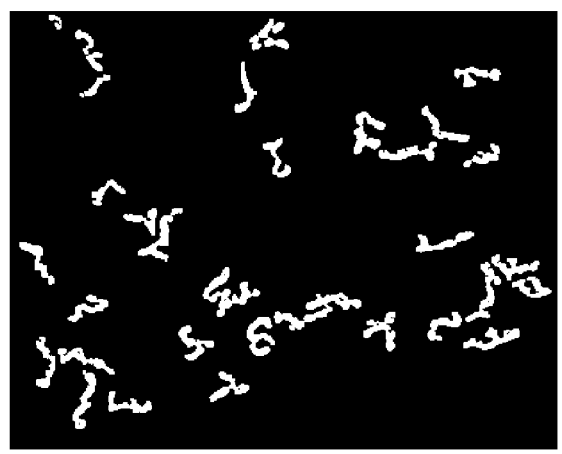

In order to illustrate the above-mentioned condition regarding the complexity requirement, FIG. 1c and FIG. 1d show respective images based on the image of FIG. 1b to which a filtering operation has been applied to let visible only the blobs which present a complexity value Cx larger than, respectively, 2 and 4.

As will be described later, the use of security devices according to the present invention allows not only to scan the blob positions, as done in the prior art, but also their shapes which leads to an upper degree of reliability in authentication or identification of valuable goods.

Now, an exemplary process of fabrication of the above security device will be described in more details, in connection with FIG. 2a.

A preferred technique employed to create the random pattern is based on polymer demixing. A polymer blend solution 20 consisting of at least two polymers and a solvent is spin coated on a substrate 21 to form a polymer layer having the shape of a thin film 22.

The starting solution is dilute enough to ensure the coexistence of the two polymers in a single phase. During spin coating, solvent evaporates and the concentration increases. When a threshold concentration is reached, the system becomes unstable and phase separates.

At the end of the process, a biphasic polymer film 22 is obtained, each phase corresponding to one of the polymer. Among the advantages of this technique are the production of unique stochastic structures, the flexibility of the patterning process, i.e. tunable size and shape of resulting structures, and a potential extension to much smaller features (submicrometer structures).

The phase separation of polymer blends is a well-known effect which occurs both in bulk materials and in thin polymer films. There is a diversity of parameters affecting the final size and morphologies of the structures obtained. Potential parameters to tune the microstructures include:
- the polymer blend system chosen
- the composition of the polymer blend
- the molecular weight of the polymers
- the spin speed during spin coating
- the concentration of the starting solution
- the surface energy of the substrate
- the evaporation rate of the solvent
- humidity of the surrounding air.

Among the parameters listed above, some mainly affect the size of the features (spin speed, concentration of the solution). Such parameters will be used to optimize the size of the features, which have to be small enough to be difficult to reproduce but large enough to be detected optically.

Other parameters modify the morphology of the structures (composition, surface energy of the substrate, molecular weight of the polymers, humidity). For instance, changes in composition will lead in drastic changes in the morphology since the mechanism of phase separation will differ. For a given range of composition (generally more asymmetrical polymer blends), the system will be metastable and the phase separation will follow a nucleation and growth. The resulting structures are circular dots (non-complex according to the criterion) of one of the polymer embedded in a matrix of the second polymer. However for another range of composition (generally more symmetrical polymer blends), the system is unstable and the phase separation will follow a spinodal decomposition. The final structure in that case is a bi-continuous structure (complex according to the criterion), as apparent from FIG. 1b. The range of composition for which a spinodal decomposition is obtained may also differ depending on the parameters listed above.

In order to find the right conditions for a given polymer pair, a methodology is proposed to screen the effect of each parameter. The core of this methodology is the fine tuning of the ratio between the two polymers, which is the most efficient parameter to tune the morphology of the structures. In order to locate the transition between nucleation and growth and spinodal decomposition, composition has to be adjusted one percent by one percent. A coarser screening of the compositions may not be sufficiently precise to locate the transition.

The second parameter considered is the molecular weight of the polymers. The range of molecular weight considered in this invention is 1 kDa to 500 kDa. Molecular weight will affect the demixing process first because the critical composition (where the miscibility gap between the polymer begins) is a direct function of molecular weight of each polymer. Moreover, the kinetics of phase separation will be affected since the viscosity of the solution will be changed.

The third parameter included in the method is the surface energy of the substrate. It is already known that it affects phase separation in thin polymer blend film due to the trade-off between the wetting of the substrate and the phase separation of the blend. For instance, one potential effect is the formation of a multilayer film due to a preferential wetting of the surface by one of the polymer. Various techniques can be considered to control the surface energy of the substrate. For silicon based materials, silanisation can be used to create highly hydrophobic or hydrophilic surfaces, while for polymeric material plasma-polymerization or oxygen plasma will be preferred. To characterize the wettability of the substrate before the fabrication of the thin film, water contact angle measurements can be performed.

The last parameter taken into account is the type of solvent used. The effect of solvent on the phase separation was already demonstrated (Walheim et al). The one skilled in the art will have no difficulty to determine solvents that can be used for a given polymer blend (the solvent having to be good for both polymers).

Figure 6:
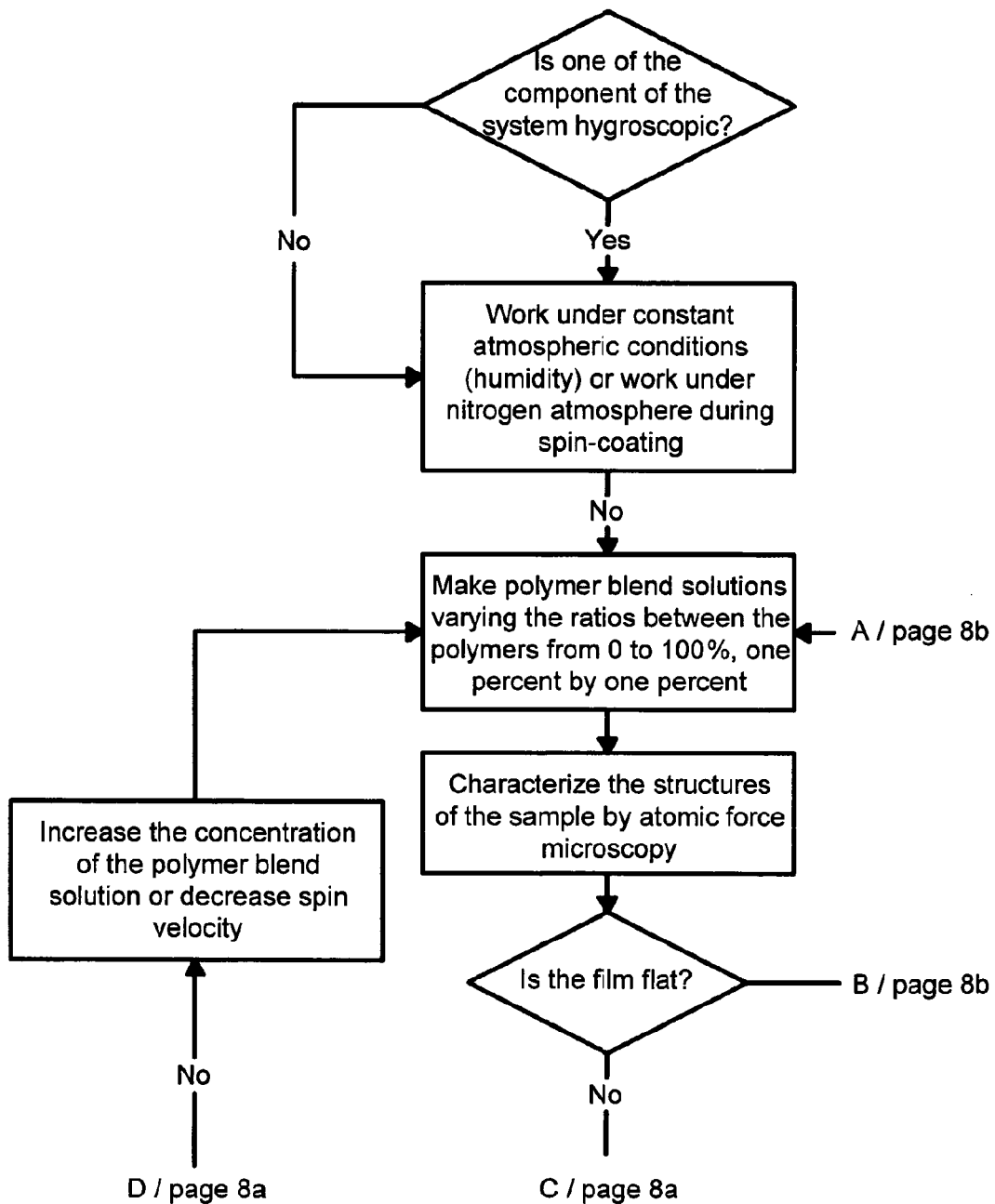
FIG. 6 is a flowchart of a methodology to obtain the microstructures used in the present invention by polymer demixing.
Figure 6:
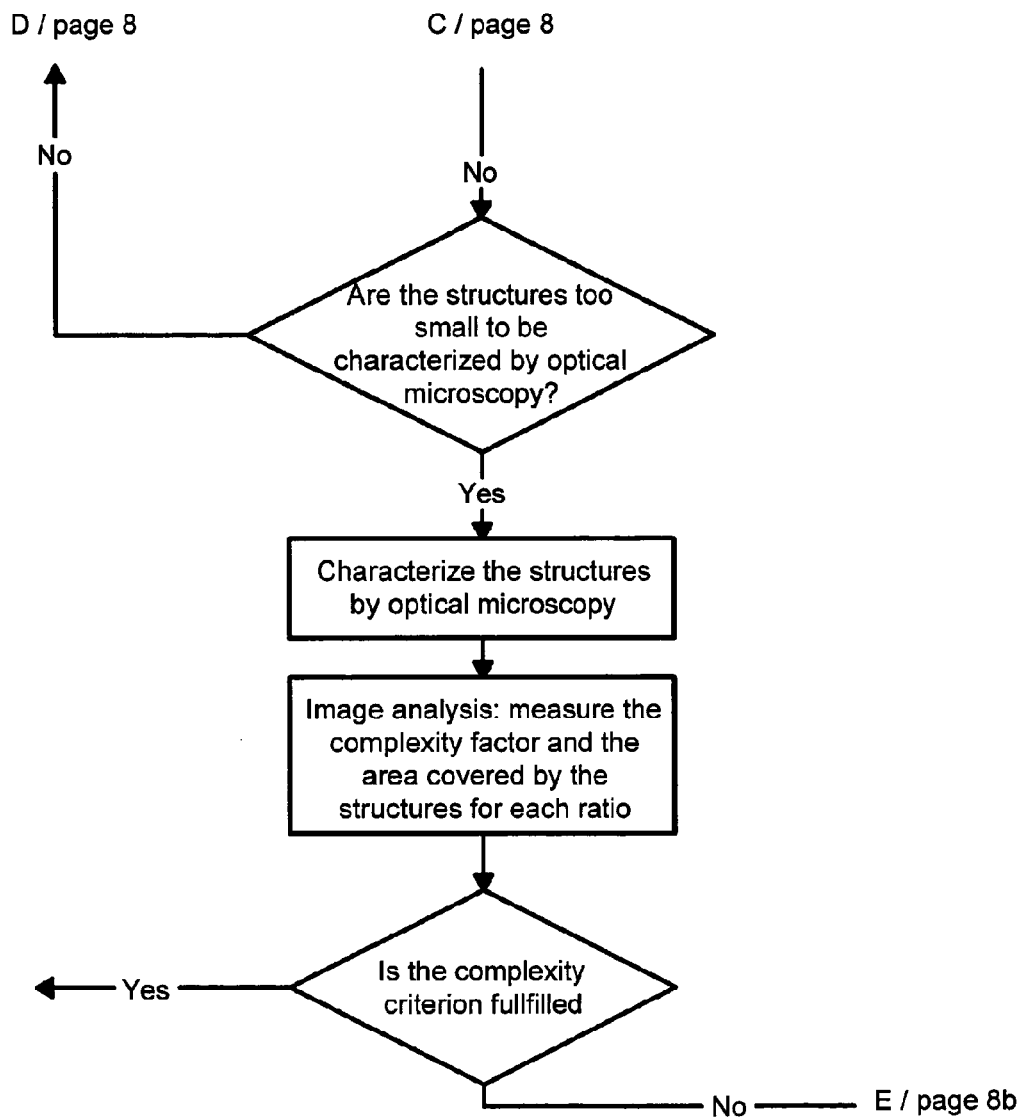
Figure 6:
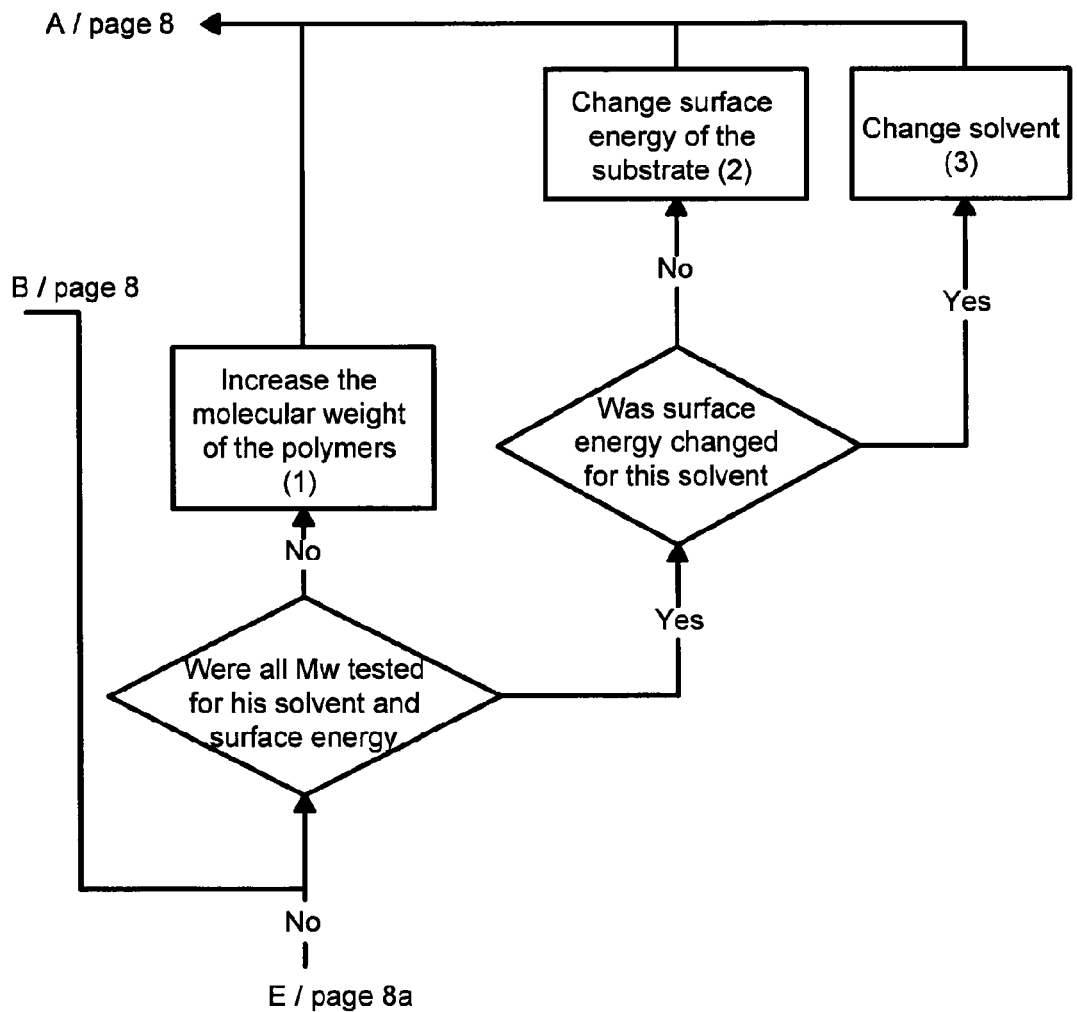

The final methodology is presented in the flowchart of FIG. 6, where:
  (1) means that the range of molecular weight considered is from 1 kDa to 500 kDa,
  (2) means that the surface energy can be controlled using appropriate surface chemistry process (i.e. silanisation for silicon based material, plasma oxidation or polymerization for polymeric substrates,
  (3) means that the number of solvents that can be used depend on the polymer pair and will have to be determined before by the one skilled in the art.

This methodology permits both the adjustment of the structure-size to the resolution of the optical instrument used to check authenticity of the mark and the adjustment of the structure morphology to the image analysis technique used (different kinds of random structures can be done).

Preferred materials which are suitable for using as a substrate are polymeric (such as PET, polycarbonate, polyacrylate, polyimide, polyolefins, cyclo-olefin copolymer), metallic (such as Ti or stainless steel), metal-oxides (such as $TiO_2$ or sapphire) and silicon-based (such as Silicon, silicon oxides, silicon nitrides or glass) materials. Other plastics or metallic substrates may be used without departing from the scope of the invention.

Examples of said first and second polymers used to create the first and second phases defining the microstructures are chosen among:
  polymers which are soluble in organic solvents, such as polystyrenes (PS), polyalkymethacrylates ($C_1$-$C_{10}$), polyalkylacrylates ($C_1$-$C_{10}$), PVME, SAN, polyalkylenes ($C_1$-$C_{10}$), polyvinylpyridines (PVP), polysiloxanes, PFS;
  polymers which are soluble in aqueous solvents, such as polyalkylenealcohols ($C_1$-$C_{10}$), polyvinylpyrrolidones, polyacrylic acids (PAA), polyacrylamides (PAM), polylysines (PLL), polyalkyleneoxides ($C_1$-$C_{10}$), polysaccharides, PDADMAC.

Examples of preferred polymer pairs suited to create a security device according to the above process are mentioned here, in a non-restricting way: PS and PMMA, PS and PVME, PMMA and SAN, PS and PI, PVP and PS, PS and PBrS, PMMA and PVP (pairs of polymers which are soluble in organic solvents). Further, polymer solutions based on aqueous solvents may also be used to carry out the present invention, such solutions containing pairs of polymers which are soluble in aqueous solvents, such as PVA and PDADMAC, PEG and PVA, PEG and Dextran. Obviously, the one skilled in the art will be able to use additional adapted pairs of polymers without going beyond the scope of the present invention.

In some embodiments, the film fabricated through implementation of this process can be used as such, by being applied, eventually glued, on a surface of a valuable good after a reference image data has been created to be stored in a security reference database.

In other embodiments, the film can be made directly on the substrate used to fabricate the valuable good, and the mark is transferred into said substrate by etching the substrate or by depositing material (metal, metal oxides) in well defined areas of the valuable good.

Thus, while carrying out a later authentication or identification process of the corresponding valuable good, a verification image data is created by using an appropriate reader, as the one that will be described in connection with FIG. 4a or 4b for example, and compared to the reference image data stored in the reference database. The valuable good is then identified or authenticated if the verification image data matches one of the reference image data stored in the reference database.

For all these embodiments, the structures presenting a stochastic pattern can be single- or multi-scale. The different possible combinations are explained below.

Single-Scale Structuring:
  a) Structured Polymer Film

Figure 2A:
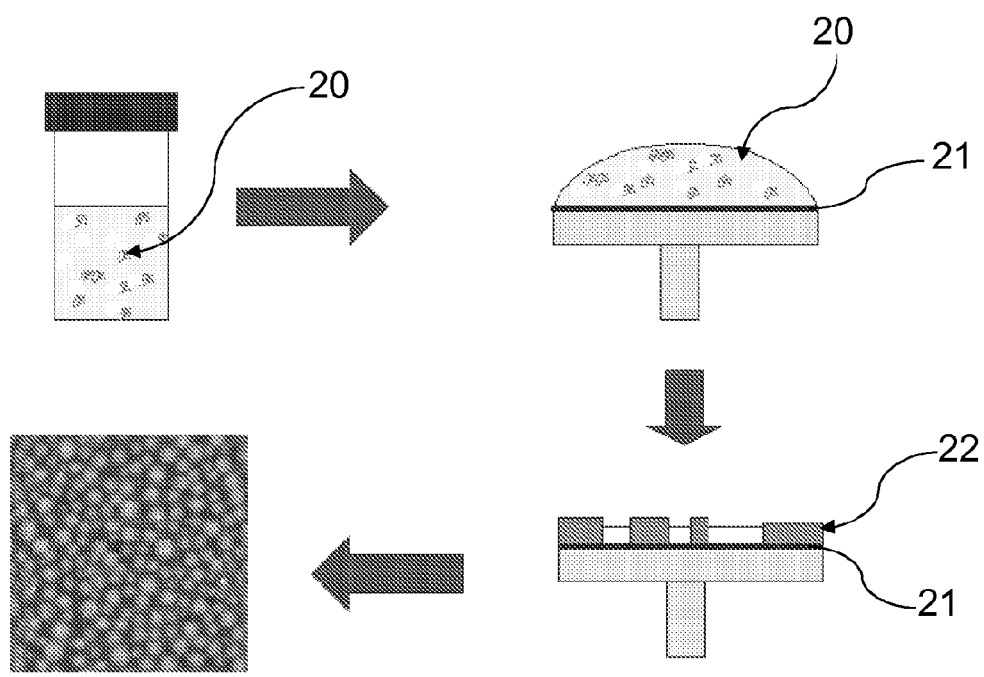
FIG. 2a shows, schematically, various steps of a process for fabricating a security device corresponding to the representation of FIG. 1b according to a first preferred embodiment.

A first embodiment for the fabrication of the mark, as briefly described in connection with FIG. 2a, is the creation of a thin film of a polystyrene (PS) and polymethylmetacrylate (PMMA) polymer blend. When the molecular weight of both polymers is around 100 kDa, the typical spinodal pattern is obtained when polymers are mixed with a PS/PMMA ratio of (30:70) w/w. If the system is changed (other molecular weights, other polymers), the methodology proposed in FIG. 6 has to be used to find the conditions leading to the spinodal decomposition of the blend. The ratio between both polymer is preferably ranging from (30:70) w/w to (70:30) w/w.

For this first embodiment, the following process is advised. The different parameters (concentration, spin speed, ratios . . . ) are given in a non-limiting manner:
  Dissolve PMMA ($M_w$=106 kDa) in toluene (polymer concentration ranging from 10 to 100 mg/mL)
  Dissolve PS ($M_w$=101 kDa) in toluene with the same concentration as the PMMA solution
  Mix the two solutions to have the desired PS/PMMA ratio
  Prepare a substrate, preferably a silicon wafer or a PET foil, of approximately 1 $cm^2$ to 100 $cm^2$, by rinsing it in a $(50:50)_{v/v}$ solution of acetone and ethanol under ultrasound treatment
  Pour a drop of the mixed solution on the substrate foil
  Implement spin-coating at a speed of several thousands of rpm, preferably 3000 rpm.

The characterization of the resulting marks can be done by using standard optical microscopy in bright or dark field. When the structures are too small to be correctly detected optically, scanning electron microscopy (SEM) or atomic force microscopy (AFM) can be used as an alternative characterization tool.

For the process mentioned above, polymer films having a thickness approximately between 100 and 300 nm are obtained, while the microstructures had lateral sizes approximately between 1 and 10 μm (depending on polymer concentration and/or the spin-coating speed). If other parameters are modified (molecular weight, ratios, solvent), sub-micrometer (few hundreds of nanometers) structures can even be obtained.

If smaller structures are needed, other self-assembly processes can be used. For instance, block copolymer microphase separation and block-copolymer were already used for the fabrication of nanostructures with lateral sizes ranging from 20 nm to 200 nm. Many block copolymers were tested such as polystyrene-b-poly-2-vinylpyridine, polystyrene-b-polymethylmetacrylate, polystyrene-b-polyferrocenyldimethylsilane, polystyrene-b-polyisoprene, polystyrene-b-polyacrylic acid.

Practically, the polymer thin film can be fabricated on suitable transparent polymer foils which can subsequently be cut in several pieces before being stuck on valuable items and used as a label as previously explained.

b) Structures into the Substrate

Figure 2B:
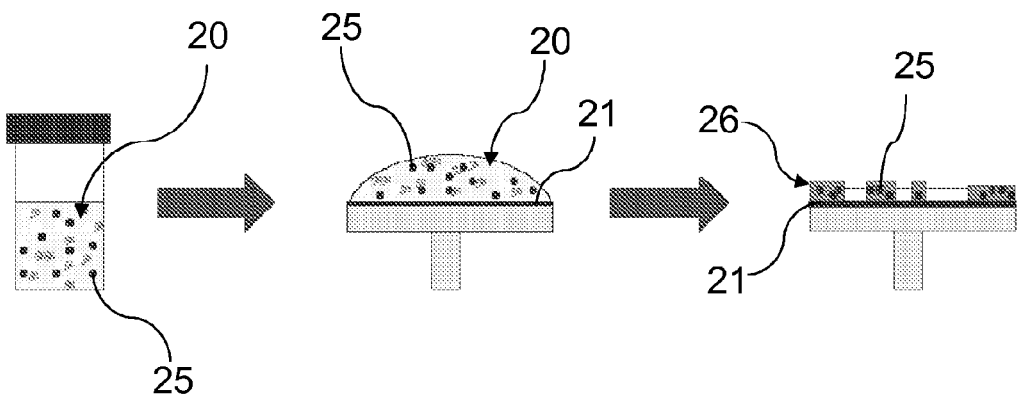
Figure 2C:
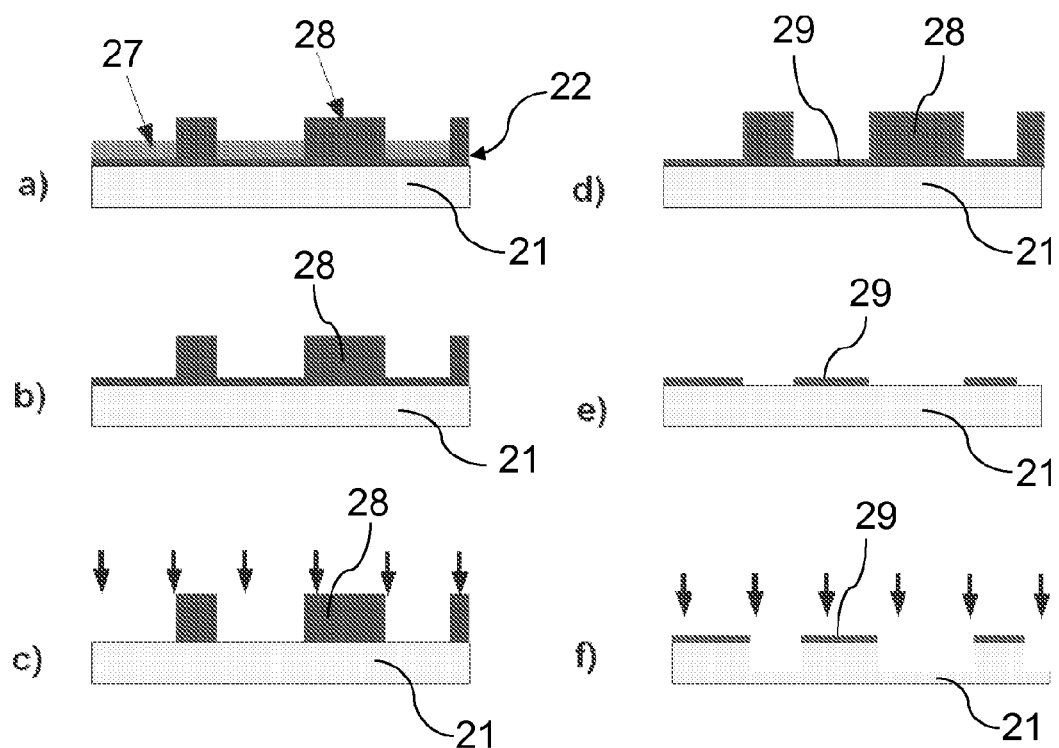
FIG. 2c shows, schematically, further steps of a process for fabricating an alternate security device according to a second preferred embodiment.

A second embodiment of the above process of fabrication is provided for improving the legibility of the security device micro/submicrostructures, as illustrated on FIG. 2c. In comparison to the first embodiment, this second process allows a better control of both the lateral size and the depth of the microstructures created on the security device.

After a polymer layer or film 22 is created through the process illustrated on FIG. 2a, it may be used to fabricate a metal etch-mask using a lift-off process. This allows implementation of a transfer of the microstructures into the substrate by means of an etching process (wet or dry etching).

For that purpose, one 27 of the two polymers 27, 28 is dissolved by means of a selective solvent, from step a) to step b) of FIG. 2c. A first dry etching is conducted down to the substrate surface in step c), as schematically illustrated by arrows, in order to remove the residual layer. A metal 29 deposition is implemented in step d) before a lift-off operation is conducted in step e) to remove the second polymer 28 down to the substrate 21 surface. A second dry etching step is implemented in f) to transfer the microstructures down into the substrate 21, as schematically illustrated again by arrows.

More precisely, the following process is advised. The different parameters (concentration, spin speed, ratios . . . ) are given in a non-limiting manner.

Make a PS/PMMA film on the substrate following the process described in the first embodiment Dissolve selectively the PS phase by rinsing the sample in cyclohexane Dry the sample with nitrogen Expose the sample to an oxygen plasma to remove any residual layer Deposit a 10 nm thin layer of Chromium on the sample by thermal evaporation Lift off: dip the sample in a good solvent for PMMA (preferably acetone) under sonication to remove the polymer and to create a porous metal etch mask Etch the substrate by deep reactive ion etching (DRIE) until the desired structure-depth is reached.

One can use alternate processes to transfer the structures in other materials of the valuable good, such as polymer foils (PET foil), silicon based materials (silicon wafer, nitrides, oxides, carbides, glass, quartz . . . ) Other etching processes adapted to each material can be used; for instance wet etching processes (KOH etch, HF . . . ) or dry etching processes (Ar or Xe sputtering, RIE/DRIE processes based on F—/Cl—/Br—/O2 or mixtures of the abovementioned gases).

Figure 3:
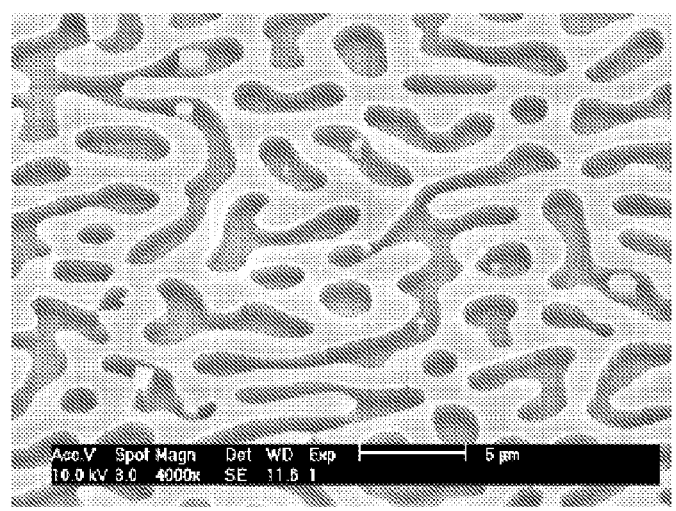
FIG. 3 shows a Scanning electron microscopy (SEM) image of a security device, resulting from the process shown in FIG. 2c.

Depths ranging from 100 nm to 4 µm could be measured by making a cross section of a sample created by the Applicant. FIG. 3 shows an SEM image of such a sample.

When only low aspect ratios are needed, the process can even be simplified by directly using the polymer film as etch mask during the dry etching process. The depth of the resulting structures is then limited by the etch selectivity between the polymer etch mask and the substrate of the valuable good. In that case, the lateral structure size remains the same but the depth of the structures will not exceed few hundreds of nanometer.

Another alternative to produce low aspect ratio structures is to make the process and stop after the lift off step. In that case the structure will be in the porous metal film, which is few tens of nanometer thick at the most.

Figure 7:
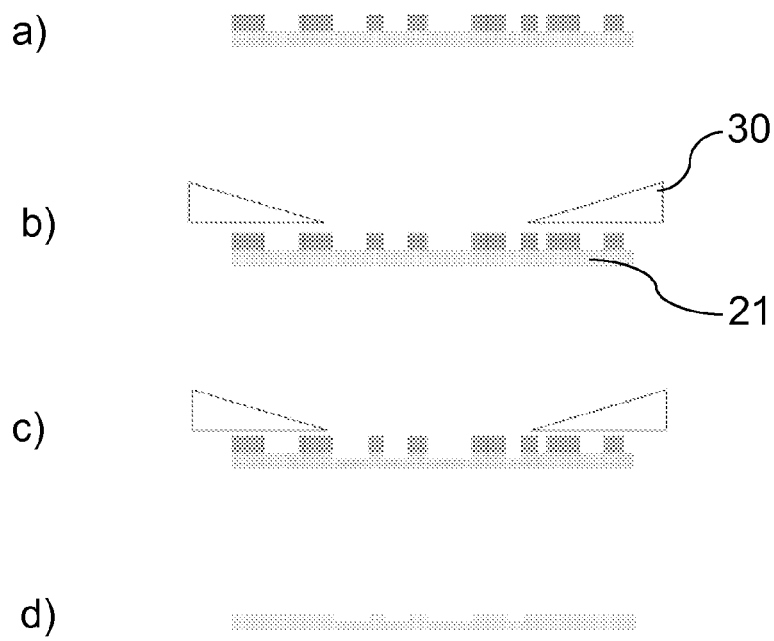
FIG. 7 shows, schematically, another embodiment of a process for fabricating a security device according to the invention.
Figure 8:
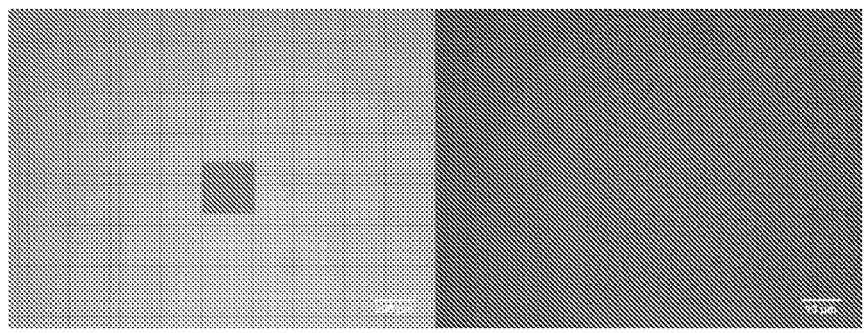
FIG. 8 is an image of the mark bearing patterned random structures obtained by the process of FIG. 7.

In order to control the location of the signature on the substrate of the valuable good, a shadow mask 30 may be used during the dry etching step as presented in FIG. 7: in step a), the same substrate bearing the structured polymer film as obtained in step b) of FIG. 2c is used. In step b), a shadow mask 30 was used to create patches of microstructures. The size of the openings in the shadow mask range from microns to millimeters. This shadow mask 30 was brought into contact with the substrate 21 bearing the structured polymer film. In step c), the etching was made through the structured polymer mask and the random structures were etched in well defined locations of the substrate. An example of the resulting mark bearing patterned random structures is given in FIG. 8 (left: low magnification, right: high magnification).

Obviously, a shadow mask can also be used during the metal evaporation step.

Moreover, this second embodiment can be used to prepare a security device, wherein the substrate obtained with the second process can also subsequently be cut in several pieces before being stuck on valuable items and used as a label as previously explained.

Multi-Scale Structuring:

This structuring means that nano-objects are introduced into a microstructure. The first embodiments, described above, allow the creation of random structures that can be used as unique signatures to mark object. In order to improve the degree of security of the mark, two other embodiments are proposed below where nano-objects are incorporated within the random structures to give optical properties to the mark.

a) Structured Polymer Film with Fluorescent Nanoparticles

This third embodiment is an extension of the first embodiment. In that case, the nano-objects are fluorescent nanoparticles which are incorporated in one of the two phases present in the two polymer film. The mark is then detected with a fluorescence reader in the verification process. This embodiment is illustrated on FIG. 2b.

For that purpose, core-shell nanoparticles 25, such as CdSe/ZnS for example, are added to the two polymer blend. These fluorescent nanoparticles are first incorporated in the starting polymer blend solution 20 which is then spin coated on the substrate in order to form a thin film 26 as presented on the drawing. The same example as described in the first embodiment can be used. However, if nanoparticles are simply mixed with these two polymers, they may aggregate.

To overcome this problem, the Applicant has found that the polystyrene may be replaced, for example, by a block copolymer containing a block of poly-2-vinyl pyridine which coordinates to the metallic atoms of the nanoparticles. There are two advantages arising from the PS-b-P2VP block copolymer. First, it allows the stabilisation of the nanoparticles and prevents aggregation. Second, it permits the control of the location of the nanoparticles in the phase-separated polymer film. Indeed, in that case the nanoparticle sequester in the PS phase since the block copolymer contains PS and P2VP. The resulting film shows thus structures both in optical and fluorescence microscopy.

The choice of the block copolymer is however critical since a too long P2VP chain in the block copolymer can lead to the formation of micelles, which modifies strongly the phase separation process. In the given example, the length of the PS block may be of 81 kDa while the length of that of P2VP would be only of 13 kDa.

To fulfill the complexity criterion, the one skilled in the art will encounter no difficulty to follow the methodology presented in FIG. 6 while tuning additional parameters that are e.g. the amount and length of the block copolymers; the size, nature and concentration of the added nanoparticles.

For instance, it is not necessary to replace all the PS by PS-b-P2VP. Several trials were made by the Applicant where only a part of the PS was substituted by PS-b-P2VP. It has been found that when less that 50% of the PS is replaced by the block copolymer, only a part of the nanoparticles can be stabilized and the rest aggregates. For 50% and more, aggregation is avoided, for the range of concentration of nanoparticles tested.

Following is a practical non-limiting example of a fabrication process of a security device according to the present embodiment of the invention, based on the above-mentioned polymers.

Such a process may comprise the steps consisting in:
dissolving PMMA in toluene,
dissolving PS in toluene,
dissolving PS-b-P2VP in toluene and then in a nanoparticle solution or, dissolving PS-b-P2VP directly in the nanoparticle solution,
mixing the three above solutions,
preparing a substrate foil, preferably made of PET, of approximately 1 cm$^2$ to 100 cm$^2$, by rinsing it in a 50/50 in weight solution of acetone and ethanol under ultrasound treatment,
placing the substrate foil on a spin-coater support,
pouring a drop of the mixed solution on the substrate foil,
implementing spin-coating at a speed of several thousands of rpm, preferably 3000 rpm.

Practically, the polymer thin film containing the nanoparticles can be fabricated on suitable transparent polymer foils which can subsequently be cut in several pieces before being stuck on valuable items and used as a label as previously explained.

The polymer solution may comprise approximately between 10 and 100 g·L$^{-1}$ of polymer, while the ratio between PS and PS-b-P2VP may preferably be of the order of 50% for the above mentioned reasons. However, this ratio may be different from a technical point of view.

Indeed, with PMMA (Molecular weight Mw of 106 kDa) and PS-b-P2VP (Mw(PS) of 81 kDA and Mw(P2VP) of 13 kDa), with a PET substrate (having a surface energy of 42 mN·m$^{-1}$), among the compositions which have been tested by the Applicant, the following non-limiting examples led to successful results with a polymer concentration of 100 g·L$^{-1}$:
50%$_{w/w}$ of PMMA and 50%$_{w/w}$ of PS-b-P2VP;
52%$_{w/w}$ of PMMA and 48%$_{w/w}$ of PS-b-P2VP (composition corresponding to the image illustrated on FIG. 1b);
54%$_{w/w}$ of PMMA and 46%$_{w/w}$ of PS-b-P2VP.

Those trials led to polymer films having a thickness approximately between 100 and 300 nm, while the microstructures had sizes approximately between 5 and 8 μm. It is however possible to get microstructure size approximately between 1 and 10 μm, by changing the polymer concentration and/or the spin-coating speed.

The Applicant has experienced that structures as small as 20 nm in lateral size may be created by using exclusively block-co-polymers.

The nanoparticles may preferably be CdSe or CdSe/ZnS particles the size of which should be comprised approximately between 1.9 and 5.2 nm, so that their corresponding emitting wavelength is included approximately within a 490 to 620 nm range. Such nanoparticles are commercially available generally under a ligand stabilized form. The ligand should be soluble in the solvent used for the polymer solution.

The nanoparticle concentration may be adapted as a function of their size. The maximal concentrations that have been tested by the Applicant for different nanoparticle sizes are given hereunder in a non-limiting manner:
diameter of 1.9 nm, emission wavelength of 490 nm, concentration of 57 mmol·L$^{-1}$;
diameter of 2.1 nm, emission wavelength of 520 nm, concentration of 49 mmol·L$^{-1}$;
diameter of 2.6 nm, emission wavelength of 560 nm, concentration of 23 mmol·L$^{-1}$;
diameter of 5.2 nm, emission wavelength of 624 nm, concentration of 6 mmol·L$^{-1}$.

Other types of fluorescent nanoparticles may be used. The most standard are indeed CdSe nanoparticles but other II-VI or III-V semiconductor nanoparticles (e.g. CdTe) could be used. Other nanoparticles are also available like PbS nanodots and lanthanide doped nanoparticles (e.g. metal oxide, ZnS, CdS doped nanoparticles). Mixture of different nanoparticles (composition, size, dispersity) presenting different absorption and emission properties may also be considered.

According to the nature of the nanoparticles, alternate functional groups can be used for the block co-polymer. Instead of pyridine in P2VP, phosphines, amines, amides, ammonium, thiols, sulphates, sulphites, disulfide, sulfonic acid, carboxylic, carboxylate groups may also be used to interact with the nanoparticles.

b) Structures Transferred into the Substrate with Multi-Scale Structuring

Figure 9:
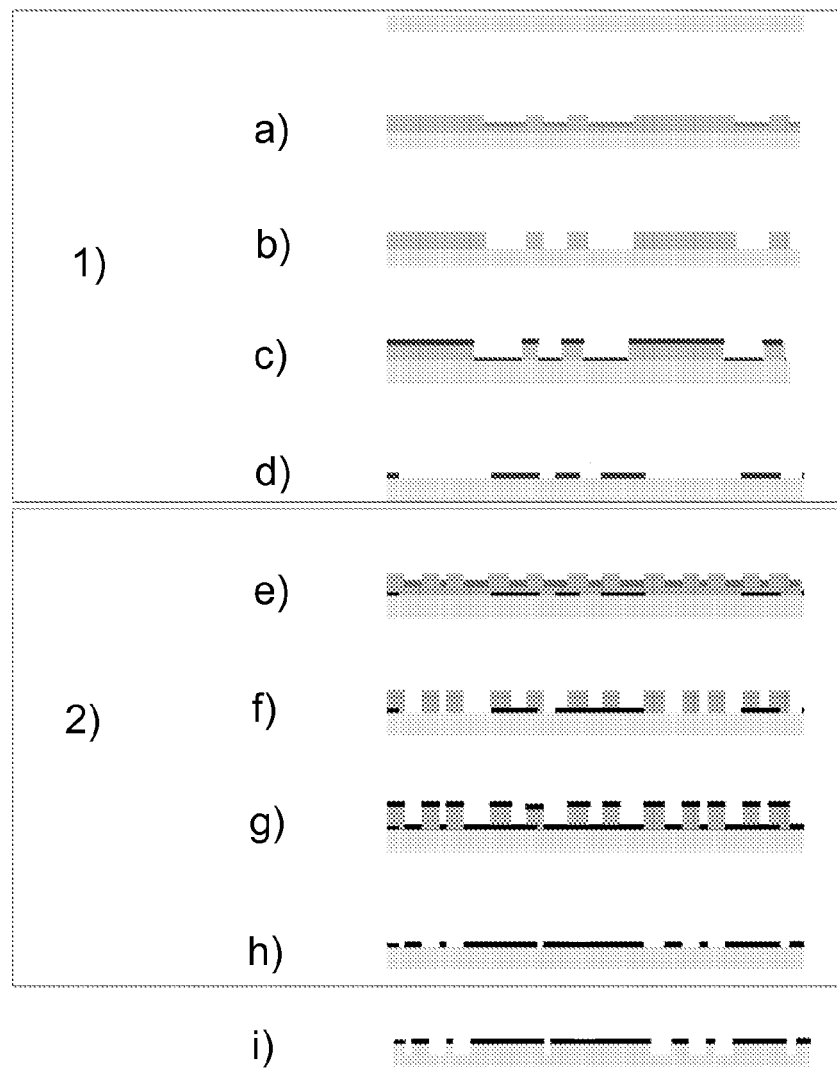
FIG. 9 shows, schematically, another embodiment of a process for fabricating a multi-scale security device according to the invention.

This fourth embodiment is an extension of the second embodiment, and more especially when the structure will be in the porous metal film, which is a few tens of nanometers thick at most. In that case, a metal etch mask bearing random microstructures is first made following the process described in paragraph for the second embodiment. To introduce the nanostructures, a second metal etch mask is made on the sample. The technique used to fabricate the nanostructured etch mask is also based on the process described in the second embodiment but the parameters were adjusted to make polymer structures with lateral sizes of the order half the wavelength of visible light (few hundreds of nanometers). The flowchart of this embodiment is presented in FIG. 9.

For the first level of structuring 1), a thin film of polymer blend is deposited on a substrate in step a). In step b), the residual layer is removed. In step c), a metal layer is deposited on the polymer structure, and in step d), the polymer mask is removed by lift-off, as described for steps a) to e) of FIG. 2c.

Figure 10:
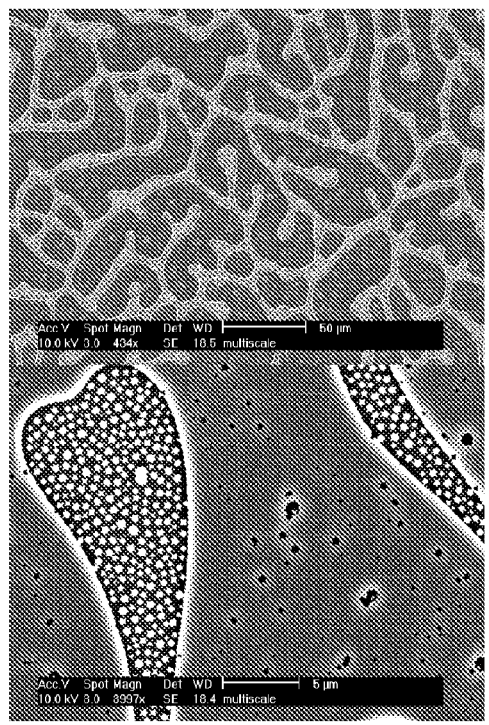
FIG. 10 is Scanning electron microscopy (SEM) images of the micropatterned nanostructures obtained by the process of FIG. 9.

For the second level of structuring 2), the same steps are repeated once time. That means that in step e), a thin film of polymer blend is deposited on the substrate obtained in step d). In step f), the residual layer is removed. In step g), a metal layer is deposited on the polymer structures, and in step h), the polymer mask is removed by lift-off. After dry etching (step i), micropatterned nanostructures are obtained on the surface, as shown in FIG. 10. The presence of such nanostructures permits an effective scattering of incident light. If the sample is exposed to white light, only the nanostructured areas will scatter light, which is a way to identify easily the microstructures by means of optical microscopy (either in bright or dark field).

The advantages of the fourth embodiment over the second one are:
first the contrast enhancement on the optical image of the microstructures due to light-scattering by the nanostructures second the fact that the mark is more difficult to reproduce due to the dual length-scale structure.

Figure 11:
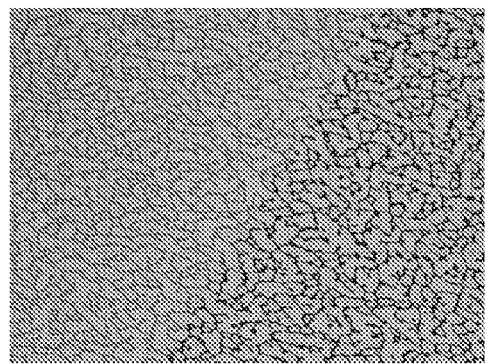
FIG. 11 is a bright field optical image of microstructures (left) and micropatterned nanostructures (right) used in the invention.

FIG. 11 shows a bright field optical image of microstructures, on the left, and micropatterned nanostructures, on the right, obtained by the process described above, comprising two levels of structuring. The contrast enhancement can be clearly seen on this Figure.

For this fourth embodiment, the following process is advised. The different parameters (concentration, spin speed, ratios . . . ) are given in a non-limiting manner.

Dissolve PS (226 kDa) in toluene (concentration of 30 mg/mL)

Dissolve polyisoprene (PI) in toluene (concentration of 30 mg/mL)

Mix the two solutions to have a $(40:60)_{w/w}$ PS/PI ratio

Pour a drop of the mixed solution on the sample having the microporous etch-mask Implement spin-coating at a speed of several thousands of rpm, preferably 3000 rpm Dissolve selectively the PS phase by rinsing the sample in cyclohexane Dry the sample with nitrogen Expose the sample to an oxygen plasma to remove any residual layer Deposit a 10 nm thin layer of Chromium on the sample by thermal evaporation Lift off: dip the sample in a good solvent for PMMA (preferably acetone) under sonication to remove the polymer and to create a microporous metal etch-mask Dissolve PMMA in dioxane (concentration of 20 mg/mL)

Dissolve PS in dioxane (concentration of 20 mg/mL)

Mix the two solutions to have a $(30:70)_{w/w}$ PS/PMMA ratio

Pour a drop of the mixed solution on the sample having the microporous etch-mask Implement spin-coating at a speed of several thousands of rpm, preferably 3000 rpm with a controlled humidity of 35% RH and a temperature of 21° C.

Dissolve selectively the PS phase by rinsing the sample in cyclohexane

Dry the sample with nitrogen

Expose the sample to an oxygen plasma to remove any residual layer

Deposit a 10 nm thin layer of Chromium on the sample by thermal evaporation

Lift off: dip the sample in a good solvent for PMMA (preferably acetone) under sonication to remove the polymer and to create a microporous metal etch-mask Etch the substrate by deep reactive ion etching (DRIE) until the desired structure-depth is reached.

As mentioned for the second embodiment, the location of the signature on the substrate can be controlled by adding a shadow mask during the dry etching step.

The second level of structuring to produce the nano-objects is here achieved using polymer demixing. However, other nano-objects can be used to achieve this (e.g. metal colloids, inorganic or polymeric beads, polymeric micelles). Once these nano-objects deposited on the surface, an etching process can be used to transfer the structures and create the micro-patterned nanostructures.

Once the sample structured, one can also protect the nanostructure (which are not mechanically resistant) by covering them with a transparent material such as a polymeric resin, a composite material (Ormocer, Nanocryl) or a sol gel. The material should have a refractive index different than that of the substrate to keep the optical effect resulting from the nanostructuring.

Moreover, this fourth embodiment can be used to prepare a security device, wherein the substrate obtained with the fourth process can also subsequently be cut in several pieces before being stuck on valuable items and used as a label as previously explained.

One can use alternate processes to transfer the microstructures in other materials using other dry etching processes, such as fluorine plasma for glass. This other technology enables to engrave a unique signature directly on the material of a valuable item. The glass or the case of a luxury watch may be marked through such a process of engraving. The latter offers a broader range of applications and guarantees a good stability over time.

The signatures resulting from the transfer of the microstructures may however be replicated using state of the art molding-processes. To overcome this problem, three alternate options are proposed by the applicant. The first option consists in filling the micro/submicro-structured surface with a material having a slightly different refractive index than the substrate. The second option is to coat the structures with a thin metal layer and fill the micro/submicro-structured surface with a transparent material. For both of these cases, this permits the creation of an optical contrast over the sample and planarizes the surface of the signature. According to the third option, the microstructures may be filled with a material containing fluorescent dyes or nanoparticles. The resulting signatures can then be characterized by means of fluorescence microscopy.

A method for securing a valuable good against counterfeiting taking advantage of the security device according to the present invention will now be described in connection with FIGS. 4a, 4b, 5a and 5b.

A preferred general method may comprise the steps consisting in:
  producing a security device as previously mentioned, directly on a surface of a valuable good or independently of said valuable good,
  creating a reference image data of the security device to be stored in a security database,
  if the security device was produced independently of the valuable good, applying the security device on a surface of said valuable good,
  creating a verification image data of at least part of the security device,
  comparing the verification image data to reference image data stored in the security database,
  identifying or authenticating the valuable good if the verification image data matches one of the reference image data stored in the security database.

An alternative general method may comprise the steps consisting in:
  producing a security device as previously mentioned, directly on a surface of a valuable good or independently of said valuable good,
  creating data from several reference images of the security device to be stored in a security database, each image being illuminated by a different illumination scheme,
  if the security device was produced independently of the valuable good, applying the security device on a surface of said valuable good,
  creating data from several verification images of at least part of the security device, using respectively the same illumination schemes as for the reference images,
  comparing the data of the verification images to the data from the reference image stored in the security database, identifying or authenticating the valuable good if the verification image data matches one of the reference image data stored in the security database; the verification being performed between data produced with the same illumination scheme.

The step of creating a verification image data may comprise an operation of reading said security device with a microscope selected from the group comprising an optical microscope, a scanning electron microscope and an atomic force microscope.

Preferably, said comparing step comprises a calculation operation based on the use of a shape recognition algorithm.

Preferably, the above step of creating a verification image data should comprise an operation of reading the security device with a handheld digital microscope including a head intended to be applied against the surface of the valuable good to allow a still positioning of the microscope with respect to the security device during the verification data image creation step.

Figure 4A:
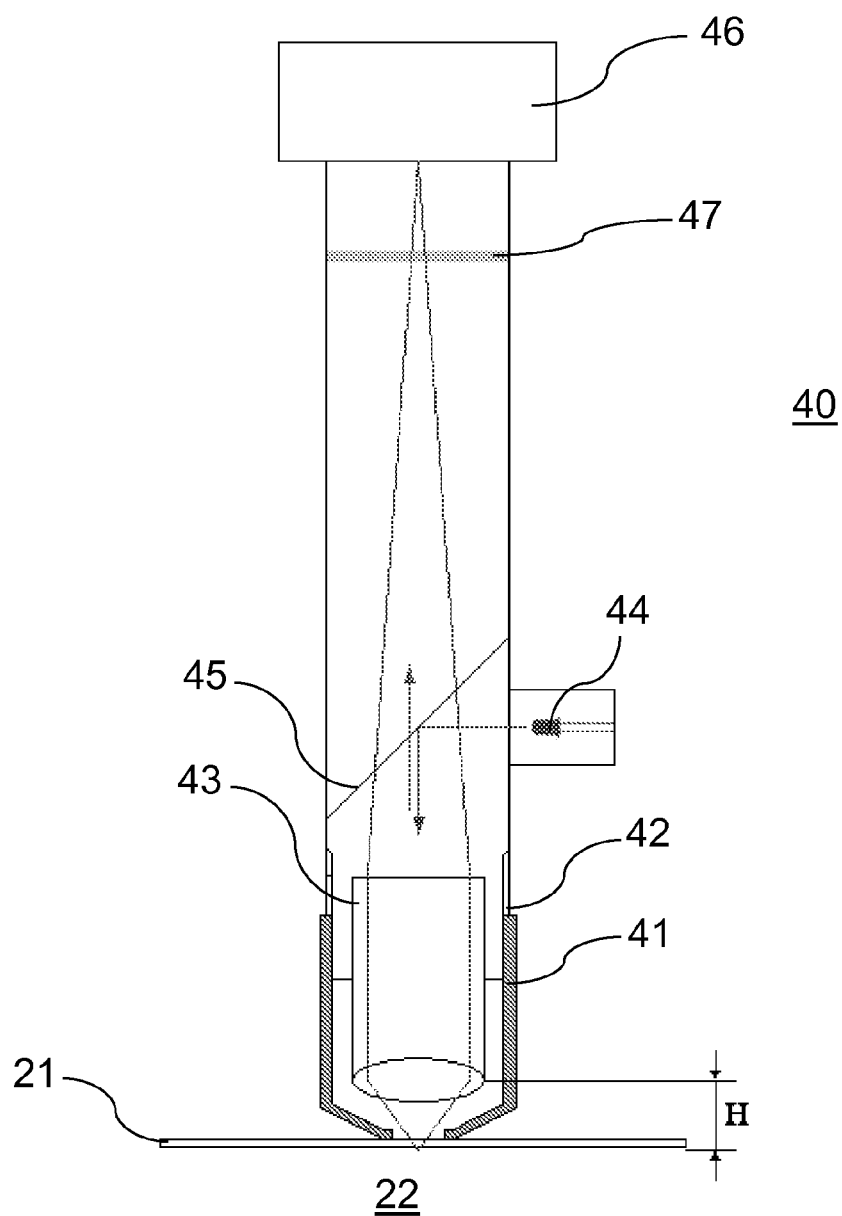
FIG. 4a shows a schematic representation of an optical instrument adapted for the creation of an image of a security device according to the present invention.
Figure 4B:
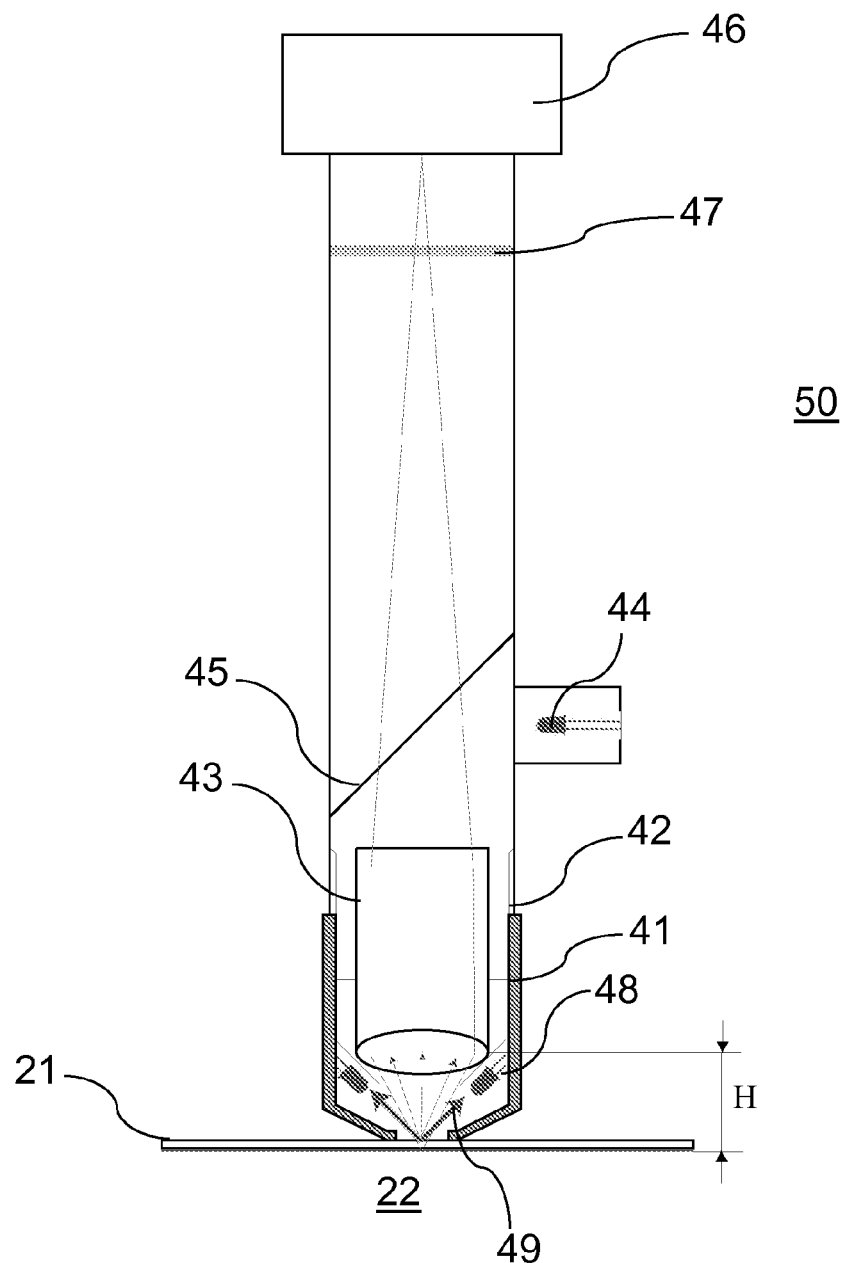
FIG. 4b shows a schematic representation of an optical instrument adapted for the creation of an image of a security with an alternative illumination scheme.

An example of such a microscope 40 is schematically illustrated on FIG. 4a. Another example of such a microscope 50 is schematically illustrated on FIG. 4b.

The microscope has an adjustable head 41 screwed on a microscope main tube through a thread 42, and serving two purposes: on the one hand, it allows a setting of the focus distance H between a microscope lens 43 enclosed within the main tube and the examined security device; on the other hand, it ensures that there are no spurious motions between the microscope and the security device thanks to the contact between the head and the substrate. Indeed, it is important to note that if motion occurs, it is impossible to get a sufficiently sharp image for carrying out a later comparison step. This last feature enables a hand-held use of the microscope, even on a vertical surface. The distance H can be adjusted by turning the microscope head 41 on its screw thread 42.

Further, the microscope has a light source 44, which might be a ultra-violet light source (when the polymer film contains fluorescent particles), or a conventional light source, for emitting a light beam which is intended to be reflected by a semi-transparent mirror 45, and focused on the security device film 22 through the transparent substrate 21. The light beam gets absorbed and re-emitted by the film and is projected by the microscope lens 43 on a digital camera 46, while crossing the semi-transparent mirror 45. The digital camera is arranged to continuously record and transmit images to a host computer, which then performs a recognition procedure.

In addition, the microscope may have several light sources 44, each of which is used to take one image. Thus, there are as many images as there are light sources. For example, light source 44 may be composed of a conventional light and a UV light, each one being lit separately.

To be able to reveal micropatterned nanostructures, the microscope illuminates the sample 22 once with a light source 44—which is a bright field illumination—and once with a light source 48—which is a dark field illumination. The light source 48 is composed of a least one light bulb that illuminates the sample with an angle between 30° and 60°, preferably at 45°, but is preferably composed of a multitude of light sources disposed on a horizontal ring that illuminate the sample with an angle between 30° and 60°, preferably at 45°. When the sample is perfectly flat, the light follows the path 49, and does not reach the camera. To reach the camera, the light must be scattered, and reveals the presence of the micropatterned nanostructures.

To be able to get approximately the same framing for more than one illumination scheme, the microscope is able to flip the illumination from one scheme to the next at each frame (several times per second).

For instance, the portable digital microscope may have a 10× magnifying microscope lens, and a digital camera with a pixel pitch which ranges from 2 to 5 μm (depending on the camera type). Thus, it images the security device with a resolution of 0.2 to 0.5 μm. To be able to extract the shape of the microstructure blobs, these must ideally have a width of about 2 to 5 μm (thus a width of 10 pixels).

If it is intended to measure a specific predefined wavelength or wavelength range, the digital microscope may further be provided with an optional optical filter 47. More particularly, when the security device encloses light emitting nanoparticles, the optional filter is advantageously chosen to filter out all the light except a narrow frequency band around the emission frequency of the nanoparticles. This allows enhancing the image contrast, and discards counterfeited fingerprints which have the wrong nanoparticles.

Obviously, when the valuable object is small enough to be placed under a conventional microscope, then the above microscope can be put on a standard microscope stand and used without its adjustable head. A 20× or a 50× magnifying optics can be used in this case—since everything is stable—, which allows the imaging of smaller structures, down to 1 μm width (below 1 micron the imaging strategy exposed here tends to break down, because it approaches the wavelength of light while having to traverse the substrate).

For sub-micron structures scanning electron or atomic force microscopes may be used for reading the security device.

Two other characterization tools, i.e. a spectrophotometer and a fluorimeter, may be used to verify that the fingerprint has been built with the right process, thus in a complementary way with respect to the use of the digital microscope. These devices may be implemented in their commercially available forms.

The spectrophotometer aims at delivering a spectrum. This spectrum can be correlated to a model spectrum, which corresponds to the one measured with the same spectrophotometer model on a reference security device. One spectrum only is needed for all the security devices produced using a given procedure. If a given security device correlation is above a predefined threshold, the device is considered to be build with the right procedure.

These two characterization tools may be used to control the presence of nanoparticles (or mixture of nanoparticles) in case nanoparticles (or mixture of nanoparticles) have been included in the security device.

A fluorimeter can be adjusted to the wavelength of the light used to lighten the security device. It measures an emission spectrum for each excitation wavelength. Using correlation on a reference security device recorded with a fluorimeter, it is possible to determine if the device is built with the right process. The use of the fluorimeter is more complex, but will reveal any errors in the materials chosen to build the security device.

Once a verification image of the security device has been created by means of the digital microscope, a recognition procedure can be carried out which enables to check the authenticity of a valuable item given the fingerprint data issued from the reading device.

While using the portable microscope, the image delivered by its video camera is in constant motion and focus changes. A selection of the best pictures may consist in writing a real-time routine that measures how sharp the image is, selects the most promising ones and sends an acknowledgement to the system when enough data has been collected.

Being able to detect when the image is on focus on the right surface of the fingerprint is not trivial. In practice the images are obtained by slightly varying the angle between the microscope and the fingerprint, thus varying the distance between the fingerprint surface and the focal plane.

To select the best picture, 5 sub-images for example may be extracted from the security device image. A Fast Fourier Transform may be applied to the sub-images, and the sum of the values may be computed in two circular regions R+ and R−, which are defined according to the stochastic properties of the fingerprint and according to the magnification ratio of the reading device. Let I be the fingerprint image, I* its Fourier transform. If $$\sum_{R+} I^{*2} > Tp \text{ and } \sum_{R-} I^{*2} < Tm,$$

then the image is assumed to be an image of a fingerprint. Tp and Tm are chosen experimentally. The sharpness estimate S of the image may be given by $$S = \sum_{R+} I^{*2} - \sum_{R-} I^{*2}.$$

The image is accepted if it is an image of a fingerprint and if the 5 sub-images have respective sharpness $S_1$ to $S_5$ larger than a threshold Ts, found experimentally. When several fingerprint sub-images are selected by the system, the sharpest, i.e. the one that has the largest S value is chosen for executing the recognition.

The above mentioned selection process is repeated for each light source, if there is more than one illumination scheme.

The one skilled in the art will be able to carry out any alternate suitable known selection method without departing from the scope of the present invention.

For successful implementation of the recognition procedure, in particular for carrying out a weak identification process as will be described hereunder, it is required that the signature exhibits sufficient information density. In more concrete terms, it is required that the phase blobs exhibit complex shapes. The complexity of a blob can be defined with the length of its perimeter L and its area A as $$Cx = \frac{L^2}{4\pi \cdot A}.$$

We consider a signature to be complex enough if the surface Sx covered by the blobs of complexity Cx≥2 exceeds 5% of the total surface of the signature, but preferably use signature with surface Sx exceeding 15% of the total surface.

If there is a doubt on whether to consider the polymer blobs made of polymer 1, or to consider the blobs made of polymer 2, it is preferable to choose the polymer blobs whose complexity related surface Sx is the smallest.

A weak identification process may be implemented, for the purpose of aligning a fingerprint image on its reference image (extracted from the security database). It may consist in encoding and extracting only specific parts of the image of the fingerprint. The coordinates of each part is stored with a description of the neighborhood of that location. When a new image is presented to the system, a similar set of neighborhoods are extracted and encoded. They are compared to the ones in the security database, and grouped into pairs. Their location in the image is then checked for consistency.

Figure 5A:
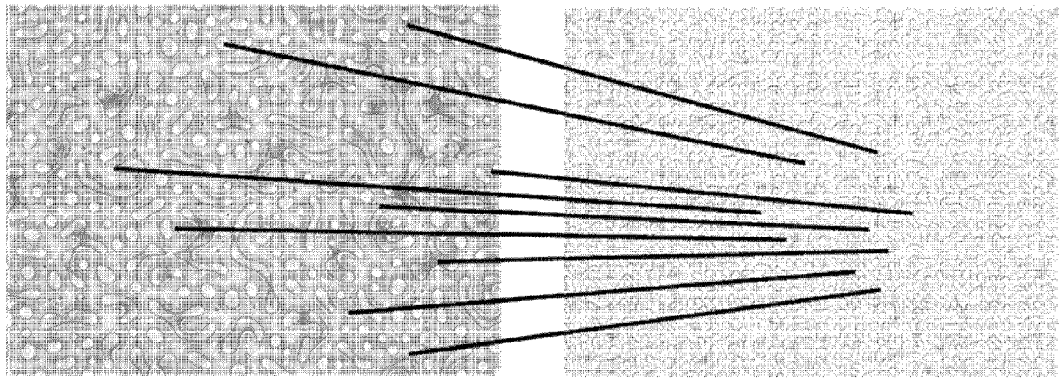
FIGS. 5a and 5b illustrate, schematically, exemplary operations which may be conducted during analysis of an image of a security device according to the present invention.

If there is a sufficient set of concordant locations, it is possible to superimpose the image of the fingerprint and the image from the security database and the weak identification is then declared a success. FIG. 5a illustrates the result of this search on two images of an experimental fingerprint taken under a desktop microscope.

Let I be the reference image of the fingerprint and $P=(p_x,p_y)^T$ the location of the extracted feature. A neighborhood of n×n pixels around location P is stored in a vector B. The process can be repeated with blurred and sub-sampled version of I, to form a set of vectors with associated positions and scales $V:\{B_i,P_i,s_i\}$. The coordinates in P are expressed with respect to the original image size. The locations P must be chosen in a systematic way, for example using extrema in a difference of Gaussian pyramid, a Harris-affine detector, a salient region detector or any other known technique that identifies atypical phase blobs using a connected components approach. It is important that once the method is chosen, the system sticks with this method.

In order to get a more synthetic description of vector B, a new vector F may be computed from B:

$$F=f(B)$$

The choice of function $f(\ )$ depends of the embodiment of the system. For example, it can be a collection of orientation histograms, a singular value decomposition, a combination of both, or a function that extracts a synthesized description of the phase blobs and their close neighbors.

Let T be a fingerprint image to be identified (T stands for "Test image"). A set of features $\{F^T\}$ are extracted from T using the technique just described. The next step in the identification process consists in finding corresponding feature pairs $\{F_i^T,F_j\}$ between the reference image I and the test image T. Ideally, the features are paired if they encode the exact same part of the fingerprint in both images. In practice, two features $\{F_i^T,F_j\}$ are paired if the distance D between them is significantly smaller than the distance between $F_i^T$ and any other features $F_{k,k\neq j}$ in image I, resulting in a feature set pair S, $$S:\{F_i^T,P_i^T,F_j,P_j\} \text{ such that } \forall k\neq j, D(F_i^T,F_j) < d\cdot D(F_i^T,F_k),$$

where d is a parameter tuned on experimental data (d>1), and D( . , . ) any suitable distance metric, for example the Euclidean distance.

The last step in the weak identification process verifies that the set of feature pairs $\{F_i^T,F_j\}$ are associated with consistent locations $\{P_i^T,P_j\}$ in the image.

In other words, there must exist a geometric transformation M such that $$P_j \approx M(P_i^T)$$

In practice M is a two dimensional transformation $$M_\theta(x,y) = \theta_1 \cdot \begin{bmatrix} \cos(\theta_2) & -\sin(\theta_2) \\ \sin(\theta_2) & \cos(\theta_2) \end{bmatrix} \cdot \begin{bmatrix} x \\ y \end{bmatrix} + \begin{bmatrix} \theta_3 \\ \theta_4 \end{bmatrix}$$

where x and y are the horizontal and vertical coordinates in the image, respectively.

To be able to account for some errors in the feature pairing process, the identification is declared successful if it fulfills the following two conditions:
1) there must exist parameter vector θ and subset U ⊂ S such that every feature in U follows the geometric transformation $M_\theta$ up to a given error E:

$$\forall P \in U, |P - M_\theta(P^T)| < E$$

where |.| is the Euclidean distance in image coordinate space.
2) the number of features in U must be larger or equal to a threshold $N_f$:

$$|U| \geq N_f.$$

If these conditions are fulfilled, the test is considered a success. The RANSAC algorithm (cf. R. Hartley and A. Zisserman, "Multiple View Geometry in computer vision", second edition, Cambridge University Press, 2003) may be used to find and 20θ U; E and being $20N_f$ set experimentally.

We should note that the recognition procedure described here can be applied when the fingerprint image used to assess the valuable item is much smaller than the fingerprint image used to mark the item. This is not the case of any method working in the Fourier domain using laser interferometry.

When using several illumination scheme, the same recognition process can be repeated for each image type; an image type being defined as an image taken under a given illumination scheme.

When using several illumination schemes, we can detect an expected change between image types: for example, when using bright field and dark field on a microstructure composed of micropatterned nanostructures, the blobs that appear bright in the bright field image will appear dark in the dark field image, and vice versa. Thus, in addition to perform a single check on the same image type, one can also perform a test across image type. In the above example, one can align the dark field image on the bright field image—using the technique described before—and verify that there is a luminance reversal. A second example is given for a microstructure containing fluorescent nanoparticles, illuminated with and without ultraviolet light. If there is a filter that selects the light emitted by the nanoparticles, the image illuminated with conventional light does not contain any visible structures, whereas the image illuminated with ultraviolet light does contain the details of the microstructure.

Two practical examples of implementation of the above recognition method are detailed hereunder.

EXAMPLE 1

From the fingerprint image, a laplacian pyramid is built, a list of local maxima is found, and are located in the corresponding lowpass image of the pyramid as described in A. Oppenheim and R. Schafer, "Discrete-Time Signal Processing", $2^{nd}$ Ed, Prentice Hall, Engelwood Cliffs, N.J. 07632, 1989. For each maxima, a local orientation is computed using the local image gradient, and a 17×17 neighborhood is extracted around the maxima locations. The 17×17 neighborhood can be represented by a vector B of dimension 289.

In an early stage of the project, i.e. before deploying the invention, one has to take a large number of fingerprint images (for example 1000), and extract the vectors B using the above mentioned technique. This results in approximately 1 million vectors B, on which a Singular Value Decomposition (SVD) can be computed (cf. H. Press, S. Teukolsky, W. Vetterling and B. Flannery, "Numerical Recipes in C++", $2^{nd}$ Ed., Cambridge University Press, 2003). From there, a dimension reduction matrix R of size 32×289 can be computed.

The features F are computed by a simple matrix multiplication with matrix R, and have dimension 32. To generate the reference image data, a set of vectors F are computed out of the fingerprint image, and are placed in a Kd-Tree structure, using the method described in S. Arya, D. Mount, N. Netanyahu, R. Silverman, and A. Wu. "An optimal algorithm for approximate nearest neighbor searching fixed dimensions". Journal of the ACM, 45(6):891-923, 1998. Position, scale and orientation associated with vector F are recorded resulting in a set $V:\{F_i, P_i, s_i, o_i, ID\}$ which also contains an ID. There is one single unique ID for each fingerprint. The resulting Kd-Tree is stored in the reference image data.

When trying the recognition procedure on a new fingerprint T, a list of Vector F (and a list of sets V) is built using the above described method. For each vector, the closest vector F (contained in set V) in the Kd-Tree is found using the algorithm described in the last mentioned reference, and the corresponding coordinates P is extracted from set V. This results in a set of coordinate pairs $\{P_i^T, P_j\}$. The rest of the computation follows exactly the method described in the former section. A coordinate pair is accepted if the matching error is below 5 pixels, and if the subset U of valid pairs is at least as big as 80% of all the feature pairs.

EXAMPLE 2

The fingerprint image is transformed into a binary image. Pixels that have values above a local mean are given value 1, the others are given value 0. To avoid merging two contiguous blobs, a morphological operation of erosion followed by dilation can be performed. Then, a connected component procedure is run. The result is an image whose pixel values are integer indices: the pixels inside a polymer blob have all the same index, and the pixel of two distinct blobs have different values. From this representation, it is trivial to treat each blob separately in a new window.

The centre of gravity of the blob is used to define the position P of the blob in the image. The blob is copied in a n×n sub-image, where n is large enough to contain the largest blob, and where the centre of gravity of the blob is set in the centre of the image. By performing a Principal Component Analysis of the sub-image (cf. H. Press, S. Teukolsky, W. Vetterling and B. Flannery, "Numerical Recipes in C++", $2^{nd}$ Ed., Cambridge University Press, 2003), we get the orientation o of the blob (i.e. the direction of the principal axis) and its scale s (the largest eigenvalue). We can then normalize its scale to a size of m pixels (for example m=20) using an isotropic scaling, and rotate the blob around its centre such that the principal axis becomes vertical. The blob is re-sampled in an image of size 2.5·(m× m) which can be represented by vector B, in the context of the weak identification process. To avoid encoding common blobs (the ones that are round or straight), we keep only these which are complex enough. In practice, the complexity can be approximated using a canny edge detector (cf. J. Canny, "A Computational Approach to Edge Detection", IEEE PAMI, Vol. 8, No. 6, p. 679-698, November 1986) on the last image, by counting the number of pixels $n_e$ that have been selected by the algorithm, and comparing it to the number of pixels inside the blob $$n_b \left( n_b = \sum_i B_i \right).$$

This gives $$Cx \approx \frac{n_e^2}{4\pi \cdot n_b}.$$

if the complexity is greater than 2, the blob is complex enough and is kept for encoding and storage in the database.

The rest of the computation is exactly the same as in the previous example. More components are just kept in vector F, i.e. the size of vector F should be approximately 30% of the size of vector B.

A strong assessment method can further be implemented to check for counterfeited fingerprints. From the weak identification process and the reference image I of the fingerprint, one can produce and image $I^T = I[M_\Theta(P^T)]$ which is in theory identical to the image T of the fingerprint being tested:

$$I[M_\Theta(P^T)] \approx T[P^T]$$

$I^T$ is called the registered image. Because of imperfections in the reading device, of imperfections in the illumination and of the aging of the fingerprint, the above equation is only approximate.

The purpose of the strong assessment method is to determine to which extent the registered image $I^T$ resembles the image being tested (T).

From an image of the fingerprint, we extract the location of the separation lines between the two polymers. At some locations, this line reduces to a dot. See FIG. 1b for an illustration. A Canny edge detector can be used to find the separation lines, as previously suggested.

Figure 5B:
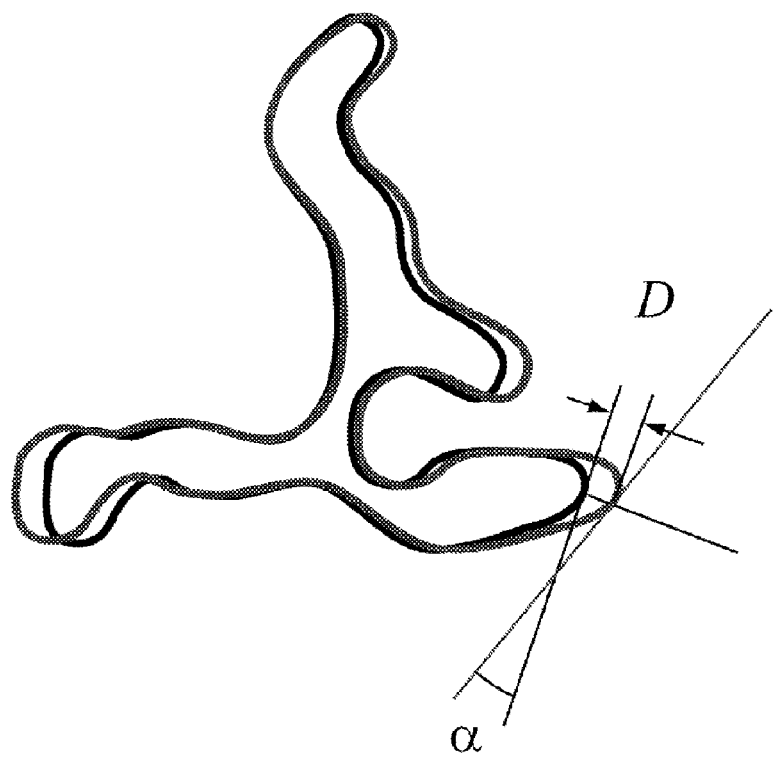

It is proposed to use the distance between the lines in image T with respect to the lines in image $I^T$ as a criterion of similarity, as illustrated in FIG. 5b. The distance $D_c = D/\cos(\alpha)$ is computed along the phase contour $C_p$. We retain each location where $D_c$ is smaller than a threshold $T_c$, and compute the proportion $D_\%$ of the retained contour.

$$D_\% = \frac{\oint_{C_p} 1_{D/\cos(\alpha) < T_c} dl}{\oint_{C_p} dl}$$

The final step consists in synthesizing the blob contour comparison $D_\%$. The number of potentially detected blobs depends on the quality of the test image T. The most common distortion of the test image T with respect to the reference image I is blur. Thus, a measure of blur is performed on image T, by analyzing the width of the transition between polymer 1 and polymer 2 on the detected blobs (cf. P. Marziliano, F. Dufaux, S. Winkler, and T. Ebrahimi, "A No-Reference Perceptual Blur Metric", IEEE Proc. International Conference on Image Processing, Rochester, N.Y., Sep. 22-25, 2002). This width defines the smallest possible blob size $S_b$ that can be detected, and also contributes to the measure of confidence of the test.

If the value of $S_b$ is too large (i.e. the image is not sharp enough) but $D_\%$ has a sufficient value, the system can ask to take more measurements of the fingerprint. If $S_b$ is acceptable, and $D_\%$ large enough, then the fingerprint passes the strong assessment method.

Comparing to other state of the art in the recognition of random structures, the method according to the present invention is unique in the sense that it checks for the shape of blobs. It actually checks first for the shape, then for the position, and finally for the shape and position combination. It does also a check on the statistical properties of the fingerprint, to be able to accept only a family of fingerprint, thus minimizing the danger of having fake fingerprints in the system.

An alternative method of using the features F extracted from a fingerprint image is possible. To efficiently retrieve a reference image from the security database that corresponds to a given fingerprint image, it is possible to build a huge tree containing all feature sets V of all the existing reference images, using the method described in S. Arya, D. Mount, N. Netanyahu, R. Silverman, and A. Wu. "An optimal algorithm for approximate nearest neighbor searching fixed dimensions". Journal of the ACM, 45(6):891-923, 1998. Then the incoming vectors F are matched to the ones in the tree. For each vector F, n nearest neighbors are found (n≈10.50 for 1 million images in the database) using approximate nearest neighbor search method. The reference image data IDs are collected for each of these n neighbors (of each vector F), and a weak identification procedure is performed for the reference image data which IDs appear most often. In this way, by performing approximately 10 weak identification procedures a reference image data can be found in a list of 1 million.

To be successful this method requires vector F to be sufficiently discriminative. In other words, a single vector F must contain a sufficient amount of information to be distinguishable from all the others. This works well when there are enough polymer blobs with a complexity value above 2 in the image. In the contrary, this does not work if the blobs are of circular shape, which have complexity equal to 1, or with blobs whose shape approaches a circle.

This also hints that the method using random distribution of beads in a matrix, and for which the position of the beads defines the fingerprint, are not suited for retrieval in a large database. Thus it is very important to be able to control the stochastic parameters of the blob shapes in the manufacturing of the fingerprint.

Note that it is required that the blob shapes are complex, but it is not required that the recognition algorithm separate each individual blob prior to any processing. An elaborate recognition technique can take advantage of the complexity of the blobs without segmenting them one by one.

Another advantage of the control over the complexity is that the statistics of the complexity of the polymer blobs can be used to determine if the fingerprint is created by a given process, and provides simple mean to verify for the presence of a fingerprint without having the reference image data.

The above description corresponds to preferred embodiments of the invention described by way of non-limiting examples. In particular, the described recognition methods are not limiting. The one skilled in the art will encounter no particular difficulty to adapt either part of the fabrication processes or identification method with respect to his needs without going beyond the scope of the present invention.

Obviously, the security device image data may be combined to further complementary information in the reference security database, such as a metadata of the secured valuable item which may include a set of data of commercial interest for the application that uses the anti-counterfeiting method (i.e. name of the author for an artwork, name of the owner, ownership history, authenticity check history, name of the expert who created the reference data, date and place of fabrication, etc.), or possibly a visual of the item. In that case, the recognition method may include additional checking operations related to this complementary information.

The invention claimed is:

1. A security device for the identification or authentication of valuable goods comprising a thin material layer presenting a stochastic pattern comprising stochastic microstructures, wherein said stochastic microstructures are arranged in blobs having worm-like shapes, said blobs having a randomness in shape with respect to each other and being arranged at random locations in said thin material layer, each of said blobs presenting a complexity factor $$Cx = \frac{L^2}{4\pi \cdot A},$$

where L is the perimeter of the blob and A its area, and wherein blobs having a Cx value greater than or equal to 2 cover at least 5% of the device surface.

2. The security device according to claim 1, wherein said blobs having a Cx value greater than or equal to 2 cover at least 15% of the device surface.

3. The security device according to claim 1, wherein said stochastic microstructures have lateral sizes ranging from 20 nm to a few tens of micrometers.

4. The security device according to claim 3, wherein said stochastic microstructures have lateral sizes ranging from 100 nm to a few tens of micrometers.

5. The security device according to claim 1, wherein said material layer includes a film comprising at least a first and a second polymers arranged respectively within a first and a second phases defining said stochastic microstructures.

6. The security device according to claim 5, wherein said first and second polymers are selected consisting of:
   polymers which are soluble in organic solvents, selected from the group consisting of polystyrenes (PS), polyalkymethacrylates ($C_1$-$C_{10}$), polyalkylacrylates ($C_1$-$C_{10}$) PVME, SAN, polyalkylenes ($C_1$-$C_{10}$), polyvinylpyridines (PVP), polysiloxanes, and PFS; and
   polymers which are soluble in aqueous solvents, selected from the group consisting of polyalkylenealcohols ($C_1$-$C_{10}$), polyvinylpyrrolidones, polyacrylic acids (PAA), polyacrylamides (PAM), polylysines (PLL), polyalkyleneoxides ($C_1$-$C_{10}$), polysaccharides, and PDADMAC.

7. The security according to claim 6, wherein said first and second polymers are pairs of polymers selected from the group consisting of:
   polymers which are soluble in organic solvents, selected from the group of pairs consisting of PS and PMMA, PS and PVME, PMMA and SAN, PS and PI, PVP and PS, PS and PBrS, and PMMA and PVP, or
   polymers which are soluble in aqueous solvents, selected from the group of pairs consisting of PVA and PDADMAC, PEG and PVA, and PEG and Dextran.

8. The security device according to claim 5, wherein said film contains optically detectable nanoparticles selectively located within one of the first and second phases.

9. The security device according to claim 8, wherein said film further contains a third polymer which is a block copolymer which one block is based on either said first or said second polymer, the second block comprising functional groups being able to interact with said nanoparticles so that they are mainly located within the phase corresponding to the polymer on which the block copolymer is based.

10. The security device according to claim 8, wherein said nanoparticles are fluorescent and comprise nanoparticles selected from the group consisting of CdSe, CdSe/ZnS, II-VI or III-V semiconductor nanoparticles, PbS nanodots and lanthanide doped nanoparticles, and mixtures thereof.

11. The security device according to claim 1, wherein said material layer is supported by a substrate made of a compound selected from the group consisting of polymeric, metallic, metal-oxides and silicon-based compounds.

12. The security device according to claim 1, wherein said material layer is made of a compound selected from the group consisting of polymeric, metallic, metal-oxides and silicon-based compounds, said stochastic microstructures being defined by etched portions of said material layer having the shape of blob holes.

13. The security device according to claim 12, wherein the stochastic pattern comprises nanostructures.

14. The security device according to claim 1, wherein said material layer is integral with a part made of a compound selected from the group consisting of polymeric, metallic, metal-oxides and silicon-based compounds, said stochastic microstructures being defined by etched portions of said material layer having the shape of blob holes.

15. The security device according to claim 14, wherein said material layer is a part of said valuable good.

16. The security device according to claim 14, wherein the stochastic pattern comprises nanostructures.

* * * * *